(12) United States Patent
Hoffman

(10) Patent No.: US 11,519,525 B2
(45) Date of Patent: Dec. 6, 2022

(54) SYSTEM AND METHOD FOR SECURING POWER AND COMMUNICATIONS CABLES AND ASSOCIATED HARDWARE WITHIN CROWN MOLDING

(71) Applicant: Jeremy P. Hoffman, Newtown, PA (US)

(72) Inventor: Jeremy P. Hoffman, Newtown, PA (US)

(*) Notice: Subject to any disclaimer, the term of this patent is extended or adjusted under 35 U.S.C. 154(b) by 0 days.

(21) Appl. No.: 16/916,969

(22) Filed: Jun. 30, 2020

(65) Prior Publication Data

US 2020/0332924 A1 Oct. 22, 2020

Related U.S. Application Data

(60) Division of application No. 16/141,536, filed on Sep. 25, 2018, now Pat. No. 10,697,564, which is a
(Continued)

(51) Int. Cl.
*F16L 3/26* (2006.01)
*H02G 3/04* (2006.01)
(Continued)

(52) U.S. Cl.
CPC ............ *F16L 3/26* (2013.01); *E04F 19/04* (2013.01); *E04F 19/0436* (2013.01); *E04F 19/0481* (2013.01); *E04F 19/0486* (2013.01); *F16L 3/22* (2013.01); *H02G 3/04* (2013.01); *H02G 3/0425* (2013.01); *H02G 3/0608* (2013.01);
(Continued)

(58) Field of Classification Search
None
See application file for complete search history.

(56) References Cited

U.S. PATENT DOCUMENTS 2,258,354 A * 10/1941 Doane ................ F21V 3/00
181/284
5,570,947 A * 11/1996 Felland ............... F21V 23/02
362/225
(Continued)

FOREIGN PATENT DOCUMENTS

EP 2833049 A1 2/2015

OTHER PUBLICATIONS

European Divisional Patent Application No. 21175277.9 Extended search report (EESR) European Divisional Patent Application No. 21175304.1 Extended search report (EESR).

*Primary Examiner* — Steven M Marsh
(74) *Attorney, Agent, or Firm* — Wilkinson Law Office; Clinton H. Wilkinson

(57) ABSTRACT

A system for crown molding that enables safely incorporating electrical and communications cabling within crown molding by creating one or more protected paths which inherently prevent overly sharp bends in crown molding corners and by mitigating damage from penetrating punctures through a decorated face designed to fracture when improperly penetrated by a screw or nail, and enables the secure installation of hardware either concealed within the molding or securely and favorably positioned through the decorative face to view or sense a room, and enables additional cable capacity that is concealed within a light reflector to increase lighting efficacy as well as power and data delivery capacity.

17 Claims, 16 Drawing Sheets

Related U.S. Application Data continuation of application No. 15/199,895, filed on Jun. 30, 2016, now Pat. No. 10,082,227.

(60) Provisional application No. 62/186,418, filed on Jun. 30, 2015.

(51) Int. Cl.
*H02G 3/06* (2006.01)
*E04F 19/04* (2006.01)
*F16L 3/22* (2006.01)
*H02G 3/10* (2006.01)

(52) U.S. Cl.
CPC . *E04F 2019/044* (2013.01); *E04F 2019/0422* (2013.01); *H02G 3/105* (2013.01)

(56) References Cited

U.S. PATENT DOCUMENTS

| | | | | |
|---|---|---|---|---|
| 5,615,943 | A * | 4/1997 | Coldren | F21S 8/02 |
| | | | | 362/225 |
| 5,694,726 | A | 12/1997 | Wu | |
| 7,114,826 | B1 | 10/2006 | Lilly | |
| 8,887,460 | B1 * | 11/2014 | Hoffman | E04F 19/0436 |
| | | | | 52/287.1 |
| 2017/0023156 | A1 * | 1/2017 | Hoffman | H02G 3/0425 |
| 2017/0321852 | A1 * | 11/2017 | Handsaker | F21V 5/04 |
| 2018/0231211 | A1 * | 8/2018 | Beck | F21V 7/005 |
| 2019/0128488 | A1 * | 5/2019 | Trang | F21V 21/048 |

\* cited by examiner

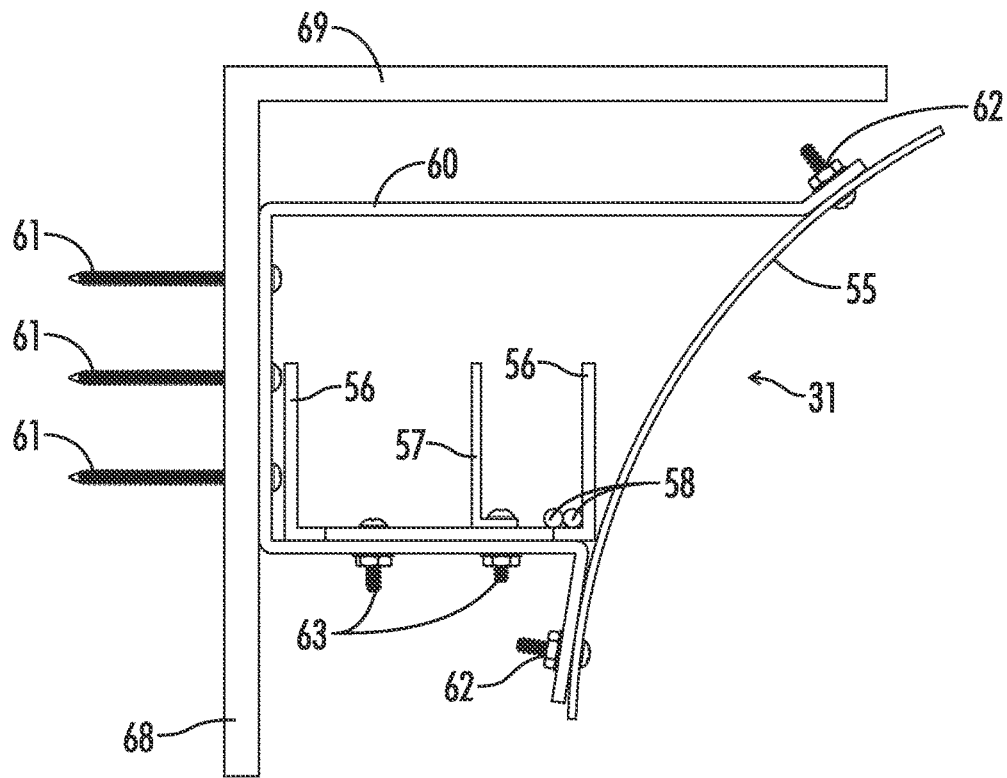
FIG. 4
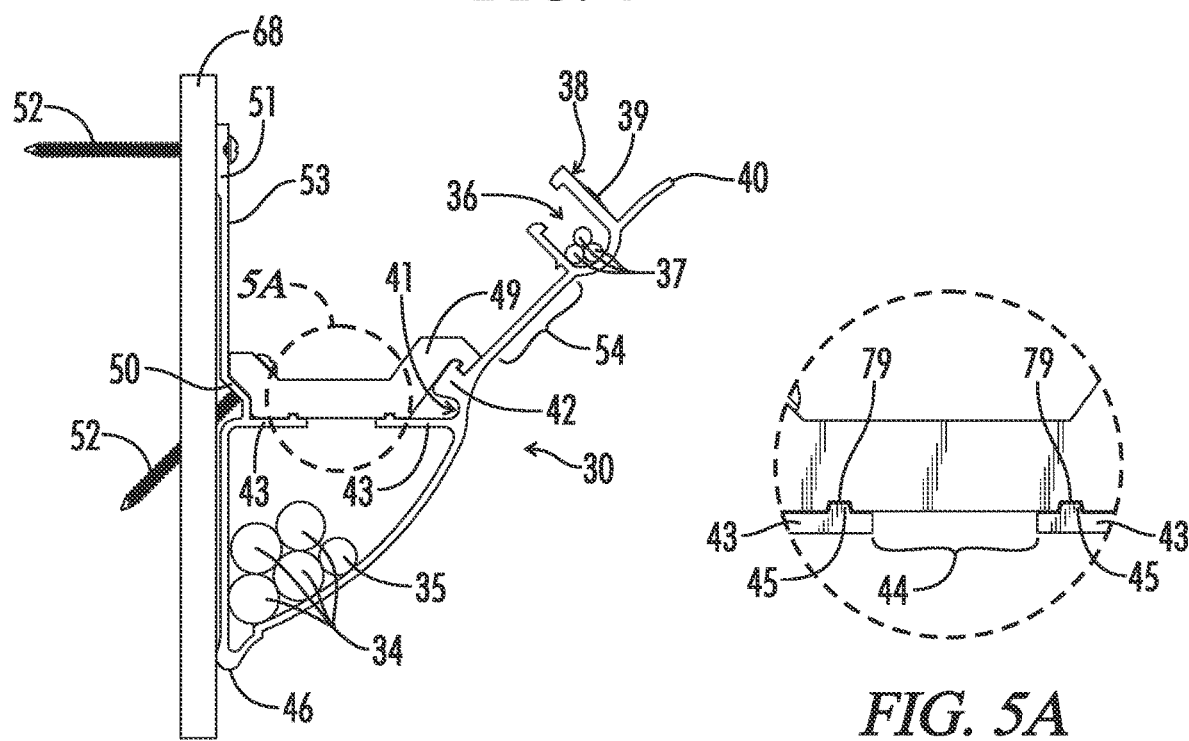
FIG. 5
FIG. 5A

SYSTEM AND METHOD FOR SECURING POWER AND COMMUNICATIONS CABLES AND ASSOCIATED HARDWARE WITHIN CROWN MOLDING

CROSS-REFERENCE TO PREVIOUS RELATED APPLICATION

This application is a divisional of U.S. Pat. No. 10,697,564 issued on Jun. 30, 2020, which is a continuation of U.S. Pat. No. 10,082,227 issued on Sep. 25, 2018, which claims priority to U.S. Provisional Pat. Appln. No. 62/186,418, filed on Jun. 30, 2015, the entirety of the disclosures of which applications and patents is hereby incorporated by reference.

FIELD OF THE INVENTION

The present invention is directed to systems and methods for installing decorative molding in a building's interior and to making use of the spaces within that molding to safely carry electrical cables, electrical equipment and to provide lighting. In particular, LED lighting has been identified as an energy saving alternative for lighting, and has characteristics that make it ideal for deployment in a linear fashion, such as within crown molding. LED light sources are also well suited to providing indirect lighting, such as lighting a space by directly lighting a ceiling, which in turn indirectly lights the space. Indirect lighting such as ceiling directed LEDs within crown molding can also improve the quality of the light as LEDs are a very bright point source, and indirect lighting such as is reflected off of a ceiling will be inherently diffused and smoother. The present invention also addresses the need for communications cables to be provided and used by some of the advanced lighting systems used today, especially those used to conserve energy by coordinating with sensors and the like. This invention also directs toward the ability to safely and securely install hardware, especially as to facilitate the interaction of power cables, communications cables and the lighting system.

BACKGROUND OF THE INVENTION

Crown molding has been used as a platform for lighting for many years, often installed a short distance below a ceiling, still substantially high on a wall yet allowing for light within the crown molding to illuminate the ceiling and, indirectly, the room within which it is installed. Well before the advent of LED lighting electric lighting such as strings of miniature incandescent lights have been placed within crown molding to accent a room's lighting. Although this has long been considered desirable, there are challenges to installing this electric lighting. First, the installed lighting needs electricity in order to operate. In most cases, this is accomplished by connecting to the building's electrical power systems. However, this often required running electrical wires within the walls and to the crown molding. This is needed in almost all implementations of the current state of the art, as most electrical receptacles are mounted close to the floor, and cords from the crown molding to these receptacles would be unsightly.

Given that running electrical wires within the wall is expensive, and can reduce the attractiveness of a crown molding lighting system, a more desirable option would be to distribute electrical power by laying wires in the space between the crown molding and the wall. While this would be convenient, most electrical codes prohibit most electrical wires that carry electrical power to receptacles from being distributed outside a wall within crown molding, especially common non-metallic sheathed cable (NM cable). Metal armored electrical cables (MC cables) are often approved to be run outside of walls, and may be permitted to be run behind crown molding, but would still need to be able to interface with the luminaire or other desired electrical equipment in a manner that is consistent with applicable electrical codes.

The interface of building wiring to electrical devices outside the wall in almost all cases requires an electrical box or a dedicated space within the luminaire or other electrical device to safely wire electrical power to the luminaire, or to connect power cables to each other or many other electrical interface needs. Without a secure location within the crown molding to install code compliant electrical boxes and other useful electrical hardware, the expense of installing lighting within standard crown molding can be prohibitive.

Another source of code compliance difficulty involves the ability to protect cables within the crown molding from unsafe bends. Under most electrical codes and requirements, all electrical cables have a defined minimum bend radius. This is a bend radius where any bends sharper than that radius are considered unsafe, as they can damage the electrical cable. Minimum bend radii vary by type of cable, but are approximately 1 inch for Ethernet type Category 6 cables, and can be higher than 4 inches for high capacity MC cable, such as would carry a typical 20 amp branch circuit for lighting over long distances. This can be a challenge within existing crown molding as the corners where the crown molding meets are typically sharp, with the crown molding itself providing a sharp corner where rear surfaces of two straight crown molding sections meet at the intersections of two walls in an inside corner, and the walls providing a sharp corner where two walls meet in an outside corner. An ideal crown molding system for cable distribution would provide a cable path within corners that inherently prevents dangerous bends, as well as a safe location to mount a wide range of electrical hardware, such that the hardware can safely interface with any of the power and communications cables within the crown molding system and those power and communications cables can be safely distributed throughout the interior space within the crown molding system without being run inside of the walls.

Another factor in the energy efficiency of lighting is the efficacy of the luminaire. A high efficacy luminaire is one in which nearly all of the light generated reaches the area to be lit. Light producing LEDs typically emit light in a wide beam angle of 120 degrees. By placing an LED light source near the top of the molding and aimed outwardly, most of the light within that beam angle will light the ceiling as intended. However, a minority of that light will be directed towards the top of the wall and the part of the ceiling nearest the wall, where the indirect light will be less effective at lighting the space. A higher efficacy crown molding system would redirect as much of that light as possible back into effective use.

In addition to saving energy with a transition to LED light sources, advanced lighting systems have also been developed which coordinate lighting levels across a space with sensors and dimming controls. The most common types of sensors used in advanced lighting systems are photo sensors which can measure the light level in a given space and occupancy sensors which can sense when a space is occupied or vacant. A controller unit processes the data from the photo and occupancy sensors and can adjust the output of the lighting system within the space. Deployment of advanced lighting systems with sensors and controls can deliver considerable energy savings over and above converting lighting to LED sources. Currently advanced lighting systems are mandated under certain conditions in the State of California under Title 24 legislation and in New York City under Local Law 88, two major jurisdictions within the United States, with mandates for and codes requiring advanced lighting systems expected in more jurisdictions in the future. One of the major challenges of upgrading a legacy lighting system to an advanced lighting system is that sensors must be deployed around a space that can effectively measure that space, with the sensors connected to the lighting system controller and the controller connected to all the lighting fixtures providing general illumination within the space. Wireless connection is developing into an option, but may not be as reliable as a wired network connection, especially for essential areas such as egress passageways for emergency evacuation. The ability to provide a lighting system within crown molding within which all of the necessary components of an advanced lighting system including sensors, controllers and light sources can be easily and safely deployed, connected and powered, would help the deployment of advanced lighting systems.

Along with the development of LED lighting as an energy saving alternative, digital communications have also greatly increased. Not only has the amount of data generated and communicated rapidly increased, but also the amount of devices that can benefit from connectivity have also greatly increased. This has led to a need to communicate vast amounts of data from many different devices in a building as the Internet of Things (IoT) brings connectivity to a wide range of devices, including to lighting systems. In buildings with suspended ceilings, deployment of the cabling and devices necessary is facilitated by the large volume of space above the suspended ceiling within which communications cables and power cables can be easily distributed. However, a large number of buildings, particularly hotels and multi-family apartment buildings, are built using slab-on-slab construction where foundational concrete slabs make up each floor with as little height as possible for each floor between slabs, usually at the eight-foot minimum required for hotels and apartment buildings by most building codes in the U.S. In these buildings suspended ceilings are not often used as they would further reduce the occupant ceiling height. Also complicating cabling installation is the fact that the ceiling is structural concrete, meaning that in most cases electrical cables must be run in the walls. Communications cabling is particularly challenging because of a frequent upgrade cycle to higher capacity data cables. These upgrades can be very expensive as they often requiring opening up a horizontal trench within the walls to run upgraded cables. The ability to safely include and distribute communications cables within crown molding would have particular value if those cables remained accessible for replacement or upgrade without any building construction required.

Another area where energy efficiency gains are possible is in the efficient generation and distribution of direct current (DC) power. All LED lighting must use DC at the light producing LED level, and buildings are still almost entirely powered by utility-provided alternating current (AC). Also, many electronic devices as well as heating, ventilation and air conditioning (HVAC) could benefit from providing DC current directly. By converting AC to DC within larger centrally located high efficiency and high capacity rectifiers, efficiency losses due to many small DC conversions at each device could be averted. One of the major hurdles to realizing this vision of building-level DC power grids is the expense of distributing that power from the central rectifiers to points of use. If a crown molding system could safely distribute new power cables from a location within the floor of a building close the existing electrical panel around the interior space of that floor of the building, and those power cables could be installed without the expense of opening walls, the energy efficiency benefits of a DC power grid retro fit to an older slab-on-slab building might make more economic sense, leading to more energy efficient buildings with lower operating cost.

Hotel architecture makes it particularly suited to a crown molding based lighting system due to their usual characteristics. A floor of a hotel used for guest rooms is usually centered around one or more corridors, off of which each hotel room is accessed. The corridors, in particular, are challenging to light using only traditional wall-mounted fixtures. Traditionally, periodic wall mounted sconce-like fixtures are mounted on each side wall to light the hallway, aiming their light narrowly up and down the wall. The resulting lighting is accordingly variable, with bright spots at the fixtures and dimmer areas between them. Hotel corridors are further good targets for an efficient lighting system because they also are considered egress ways in the fire protection code and must be lit, at least at some level, 24 hours a day. Therefore, an energy saving lighting system would save more energy and reduce costs due to constant operation. Also, corridors are long relatively narrow spaces well suited to be lit entirely by well-designed indirect lighting from crown molding.

In addition, hotel rooms provide an opportunity to take advantage of a crown molding system that can provide efficient lighting, as well as communications cabling. First, most hotel rooms are relatively small spaces where a perimeter lighting system lighting indirectly within crown molding can provide a substantial portion of the needed light. Further, a crown molding system that can distribute communication cabling can also enable hotel automation systems, which can contribute greatly to energy savings within hotel rooms. Hotel automation systems can provide remote management of vacant hotel rooms to minimize the energy use when a guest is not present, manage the HVAC system to less energy consuming settings and even control motorized window coverings to reduce passive heating and cooling. If the communications cabling necessary to deploy such a system can be easily and safely installed within a crown molding system that is itself easily installed, the expense of installing an energy saving hotel automation system as well as the revenue lost due to construction time for the retro fit of an existing hotel could be substantially reduced.

An additional challenge for merging all the benefits of advancements of technology within existing buildings which were not originally built to serve these needs is mapping. The Global Positioning System (GPS) has become an essential tool for many people, providing freely available and accurate location data to many different devices, most notably mobile phones. When accurate and freely available positioning services such as GPS are combined with accurate maps such as are readily available on mobile phones, all manner of location based services can be provided. Most commonly the ability to provide navigation while driving to a location whose route is not apparent. This use of GPS location data combined with mapping has become incredibly widespread, even generating concerns about dependence on GPS mapping at the expense of other more traditional navigation skills. The challenge of bringing this widely adopted service into buildings is that the GPS system requires line-of-sight view of the sky in order to receive GPS location data. Those who provide mapping services do have the capability of generating accurate maps of buildings, however the accurate and freely available GPS system cannot provide location data reliably indoors. There are some methods of working around this problem including using the position of Wi-Fi network nodes to triangulate in indoor position. This has been engineered to provide some location data, but the accuracy of the positioning data is limited. Further, the location and physical security of installed Wi-Fi units can vary greatly. In particular, Wi-Fi routers are commonly attached to suspended ceiling grids. Attachment to suspended ceilings does provide easy access to power and communications cabling, but does not provide a great degree of physical stability or security, as suspended ceiling tiles are designed to be removed and frequently are to provide access to the many various services and cabling within a suspended ceiling. For this and other reasons Wi-Fi location data are not uniformly fine grained, and provides an opportunity for improvement in both accuracy and security.

One example where accuracy and security of indoor location data is critical is in robotic navigation. In particular, providing for a device such as a motorized wheelchair to be able to use both accurate indoor mapping combined with accurate fine-grained location data, with high assurance of the accuracy of that data, and employ that information to enable safe transportation of individuals for whom manual navigation of a motorized wheelchair is challenging or not possible. This example illustrates the need for not only accurate data on position, but for high confidence that the location data is accurate. In the previous example of a Wi-Fi router mounted to a suspended ceiling grid, if a service technician accesses the ceiling to service an item and changes the position of the Wi-Fi router the location data provided could be incorrect. Ideally a system of location beacons capable of the fine grained accuracy necessary when guiding the safe routing of an individual via a robotically controlled device would also incorporate a mounting location that provides a high degree of mechanical security, ease of installation, and ready access to power and communications cabling as needed.

Some notes on communications cables, power cables and the National Electrical Code may be helpful with respect to the invention described herein. There are three types of cables referred to herein with respect to the invention. Power cables, fiber optic cables for communications signals and copper conductor communications cables. Power cables carry power can be a safety hazard to people (as in from electrical shock) and can cause a fire (due to electric spark, generated heat or both) if not protected accordingly. The safe methods for deploying any electrical system with power cables are described in the National Fire Protection Association's book N.F.P.A. 70, also known as the National Electrical Code or the NEC. In particular, chapters 1 through 4 describe methods of safely deploying power cables and systems that use them. The NEC also defines a type of electric cable that carries electricity, but is not considered a safety risk due to shock or fire. These circuits are referred to as Class 2 circuits, and are limited to less than 100 watts of power, and a maximum of 30 volts. Class 2 circuits are often referred to as "touch safe" and the safety requirements for deployment are relaxed and less stringent commiserate with the reduced risk. Examples of Class 2 circuits are copper based communications cables such as Ethernet cables of any category type, DC power supplies for LED lighting at 24 volts and 100 watts, and the LED light strips themselves when powered by a class 2 power supply. Most electronic devices from digital thermostats for HVAC control to laptop computers and mobile phones are powered by a DC class 2 power supply. All class two cables must be protected from power cables, because a fault in a power cable could possibly energize a class 2 cable with dangerous energy levels. Therefore, a crown molding with segregated locations for power cables and copper communications cables would be desired. Fiber optic communications cables, however, are not at all electrically conductive as they transmit data as light over a non-conductive transparent medium. As such fiber optic cables do not pose a shock or fire risk by themselves and they are not at risk of being inappropriately over-energized due to a fault in power cables. Therefore, the NEC permits fiber optic cables to be co-located with power cables for distribution.

There are several current approaches in the current state of the art to address these issues. Creative Crown (www.creativecrown.com) offers a foam crown molding that is adhered to the wall. The molding is described as providing a location near the top of the crown molding, however there is no provision for a reflector to increase efficacy as part of the system. There is also no space or provision for a power source for the LED light strip to be contained on within or about the crown molding. Therefore, the power supply must be located outside of the crown molding. There are provisions for cables to be hidden within the crown molding, however this appears to be limited to communications wires and audio speaker wires. There is no provision for minimum bend radius, and there is no access to the cables once the crown molding is installed on the wall with adhesive.

In U.S. Pat. No. 7,958,685 B2, Rowholt describes a crown molding comprised of two pieces that combine to result in a crown molding mounted at the junction of a wall and ceiling. There is no provision for lighting; however, Rowholt does describe electrical cable distribution, but this seems limited to low power communications cables, and not power cables. There seems to be no provision for protecting power cables, and their inclusion within the molding system is likely to be considered unsafe. Further, there is no provision for preventing unsafe bends, particularly at outside corners, as illustrated in FIG. 20. This system does not provide a location or method for electrical hardware or equipment to be safely installed.

Seamans et al. in U.S. Pat. No. 6,911,597 B2 describe a molding system of multiple molding types, including crown molding, designed to include electrical wiring. For their crown molding Seamans et al. describe a multi-part system that requires mounting at the ceiling. No provisions for lighting are included. The molding is described as safe for low power wiring only. There are no provisions for installing electrical hardware or other components. There is no provision for limiting the bends of cables so as to not cause damage.

Hoffman, a co-inventor of the present system and method, and MacMillan describe in U.S. Pat. No. 8,887,460 several crown molding embodiments. The crown molding described in FIG. 10 does show a compartment that could hold electrical cables, however no safety provisions for cable bends or cable protection are described. Horizontal support member 72 could provide a location for hardware, but no means for securing hardware are described. An electrical component such as an electrical box could be secured with adhesive to horizontal support member 72, however the component could not be easily removed, moved or replaced. Fasteners such as screws could secure an electrical box to horizontal support member 72, however those screws would penetrate into the compartment below, creating an unsafe condition for any cables contained there. It would not be feasible to use fasteners to secure an electrical box to mounting surface 18 and the face of the molding would prevent getting a tool in position. None of the embodiments in the '460 patent which all contain closed compartments could contain electrical cables describe any method of installing, accessing or securing cables. There is no provision for protecting cables from sharp bends. There is no provision for a high-efficacy lighting location or reflector.

In U.S. patent application Ser. No. 15/011,474 Hoffman and MacMillan describe several embodiments of a crown molding system preferably designed to install easily and securely on irregular walls while maintaining a preferentially straight crown molding face as seen in the room. FIGS. 1 through 7 describe a crown molding system whose method prescribes securing connection between adjacent molding sections with a piercing fastener entering into the enclosed inner space. There is also no provision for cables entering or exiting the molding system. There is no provision for preventing unsafe bends, nor for securing electrical hardware. Embodiment 2, FIGS. 8 and 9, describe a crown molding with a closed compartment, however there are no provisions for safe cable entry or exit, and an electrical hardware on horizontal member would be similarly difficult to secure in a manner that is removable and does not penetrate the lower compartment. There is no provision for preventing sharp bends in cables, and no high efficacy lighting location nor a reflector. Embodiment 3, illustrated in FIGS. 10 through 13 describes a crown molding similar to embodiment 2, but with a split horizontal member. The lower compartment is now easily accessed for cables, however there are no provisions for providing a cable path that inherently limits bends. There is also no provision for protecting the cables from damage by penetration of the decorative face. Bulkhead 96 provides a convenient surface angled to allow a penetrating fastener to be easily driven to secure horizontal support structure 100, where that fastener will not penetrate the bottom compartment. Horizontal support structure serves to prevent the decorative face pulling away from the rear wall, but is not designed to securing tightly against outer horizontal member 98. There is also no high efficacy lighting location, nor an accompanying light reflector to maximize efficacy.

BRIEF SUMMARY OF THE INVENTION

The present invention facilitates safely routing, securing and using power and communications cabling within crown molding. The invention includes providing a safe path for electrical cables that inherently prevents unsafe or sharp bends that could otherwise damage the cables. This is particularly useful within crown molding, where most spaces within which crown molding is installed have corners. The invention creates a smoothly curving path or paths, with bends sized as needed, which inherently prevent damaging unsafe or sharp bends and route cables safely around what would otherwise be a sharp corner at the intersection of the rear surfaces of crown molding in an inside corner, or the sharp corner at the intersection of two walls in an outside corner. The invention also provides a safe method for cables to enter and exit the crown molding and any installed equipment and, where a cable path is enclosed, safe entry to that cable path.

The invention also provides a location within the molding, and a method for conveniently and safely securing, electrical and other associated hardware within the molding. Hardware and equipment can be installed in this location using simple screws or other fasteners in concert with the lever action of a pivot and socket behind the face of the crown molding to provide secure seating of the equipment without ever piercing or otherwise violating a cable path, and whose installation method never disturbs the face of the crown molding. Further, installed equipment remains visible and accessible from above and yet concealed and hidden from view to occupants of the room below.

The invention also describes a high efficacy light location with placement of an efficacy increasing light reflector, installed separately from the molding but an integral part of the crown molding-based system. This light reflector is an integral part of this crown molding system in that it also serves to conceal additional cable capacity by leveraging the ordinary brackets that place the light reflector to also provide support for additional cable capacity either directly or by supporting the installation of known cable support devices such as cable tray systems.

This invention also provides a location to securely mount electronic devices and sensors through the decorative face of the molding. This is done by providing a dedicated area of the decorative face which is designed flat and without decorative curves for a set section of the profile, and providing a parallel plane of similarly flat surface on the rear of the decorative face of the molding. This dedicated area of parallel flat surfaces is placed deliberately between the communications cable routing path and the power cables routing path, providing secure and easy access to both. A secure location is particularly important to the deployment of a coordinated multi-camera array that leverages technology outside this invention to combine the output of multiple cameras usefully.

The invention provides for the entirety of cabling installation and routing and all associated equipment installations related to this invention to be installed. All of the benefits of this system and method are deployed after the entire crown molding system has been installed and secured using existing techniques and methods known in the art. Also, any changes or upgrades to the cabling, electrical equipment or systems installed using this invention can be executed with minimal or no modifications to the base crown molding system. In addition, all hardware and electrical equipment installed within and onto the base crown molding is readily visible and can be easily inspected, serviced and replaced as needed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a more detailed profile view of the installed light reflector portion of the present invention detailing the installation method of the light reflector to the bracket and the bracket to the wall, and the installation of a cable tray with a divider to separate power and fiber optic cables from copper based communications cables in a concealing manner behind the reflector and supported by the reflector bracket.

FIG. 5 is a more detailed profile view of the installed crown molding of the present invention in which the installation method is illustrated as well as the separate locations for power and fiber optic cables and copper based communications cables also illustrating the preferred location of a flat surface for mounting devices through the face of the molding to view or sense the room or space within which this embodiment is installed.

FIG. 5a is a magnified profile view taken from within FIG. 5 detailing the alignment ridges and corresponding alignment channels and, in particular, the trapezoidal form of the alignment ridges and channels.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. Reference will now be made in detail to the preferred implementation of the present invention as illustrated in the accompanying drawings. Wherever possible, the same reference numbers will be used throughout the drawings to refer to the same or like parts.

FIGS. 1 through 13 illustrate a first preferred embodiment of the present invention. FIGS. 14 through 21 illustrate an alternative embodiment of the present invention. FIGS. 22 through 26 illustrate a third embodiment of the present invention with FIG. 24 illustrating an adaptation to one portion of that third embodiment. For orientation purposes, it will be understood that where embodiments of the invention are described herein with reference to the Figures using terms such as "horizontal", "top", "uppermost", "bottom", "length", "height", and other terms of orientation, such terms are referring specifically to the orientation of the embodiments as they are oriented in the Figures, and as the invention would be normally utilized, and should not be construed in any other limiting manner.

Figure 1:
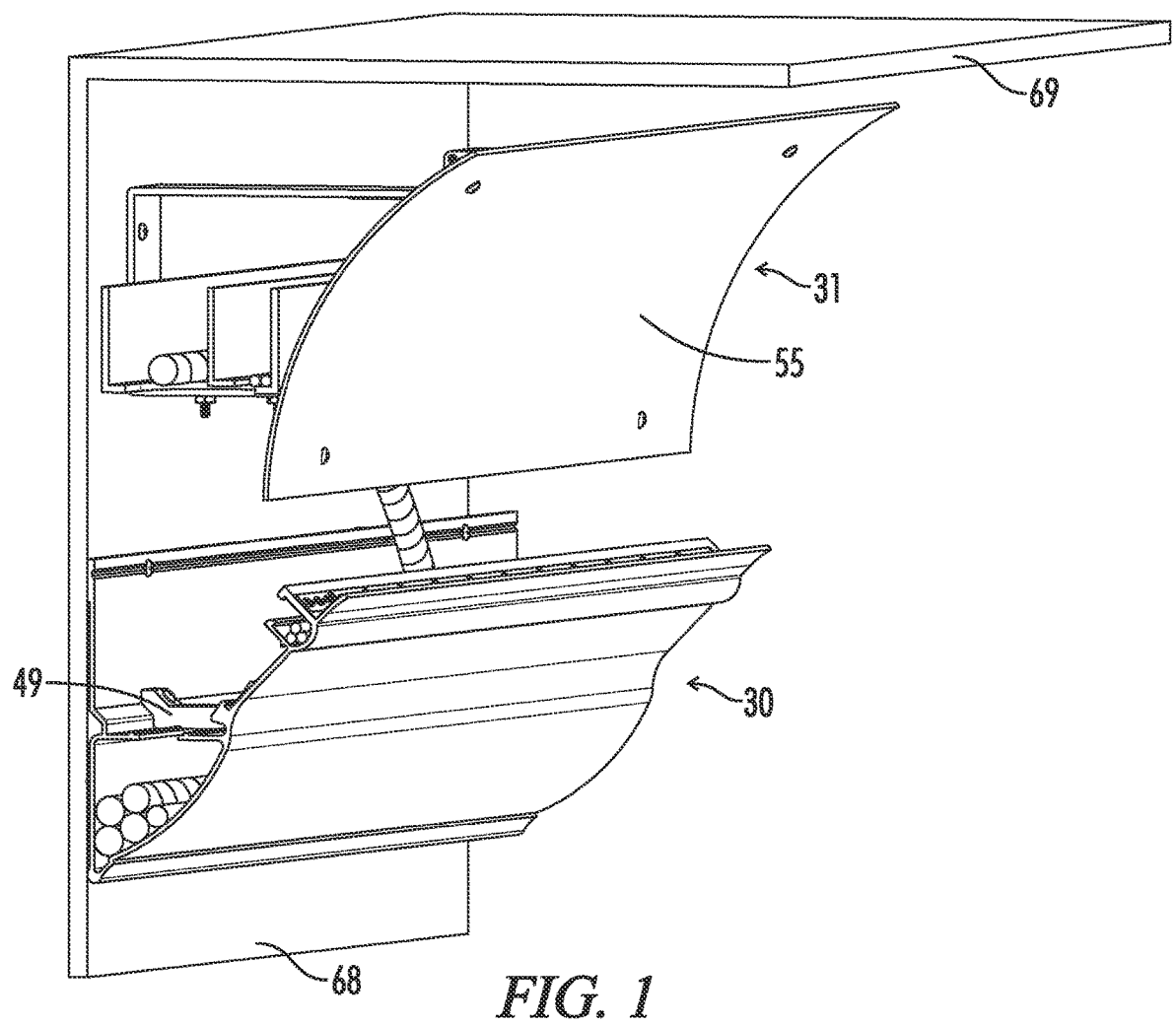
FIG. 1 is a perspective view of a preferred first embodiment of the present invention, which illustrates the longitudinal nature of the invention (from left to right in this Figure), shown after installation onto a wall and close to the ceiling, and also illustrating the placement of a light reflector assembly to favorably redirect light produced by an LED light strip within the crown molding to the intended ceiling target.

Referring now in particular to FIG. 1 in which the first preferred embodiment of the present invention is shown, straight crown molding section 30 and light reflector assembly 31 are shown installed on wall 68 within a room having a ceiling 69, with the top edge of light reflector assembly 31 positioned just below ceiling 69. Although the representation of the length of crown molding assembly 30 and light reflector assembly 31 is finite, it will be understood that the both crown molding assembly 30 and light reflector assembly 31 may extend longitudinally as needed. Horizontal reinforcing structure 49 is also illustrated in FIG. 1 and is installed as part of the molding system within which this invention is employed.

A base crown molding system which may be adapted to deploy the first preferred embodiment is described in the inventor's pending U.S. patent application Ser. No. 15/011,474, the entirety of which is hereby incorporated by reference. While the crown molding system of the invention may utilize moldings having other structures and compositions, the crown molding system described therein is designed specifically to attach securely to irregular walls such as are expected in retrofit installations of this first preferred embodiment of the present invention within existing buildings while crown molding as seen in the room remains preferentially straight. The crown molding system described therein is also designed such that the added weight of any components or other hardware installed within that molding system reinforces the desired position of the crown molding system on the wall.

Figure 2:
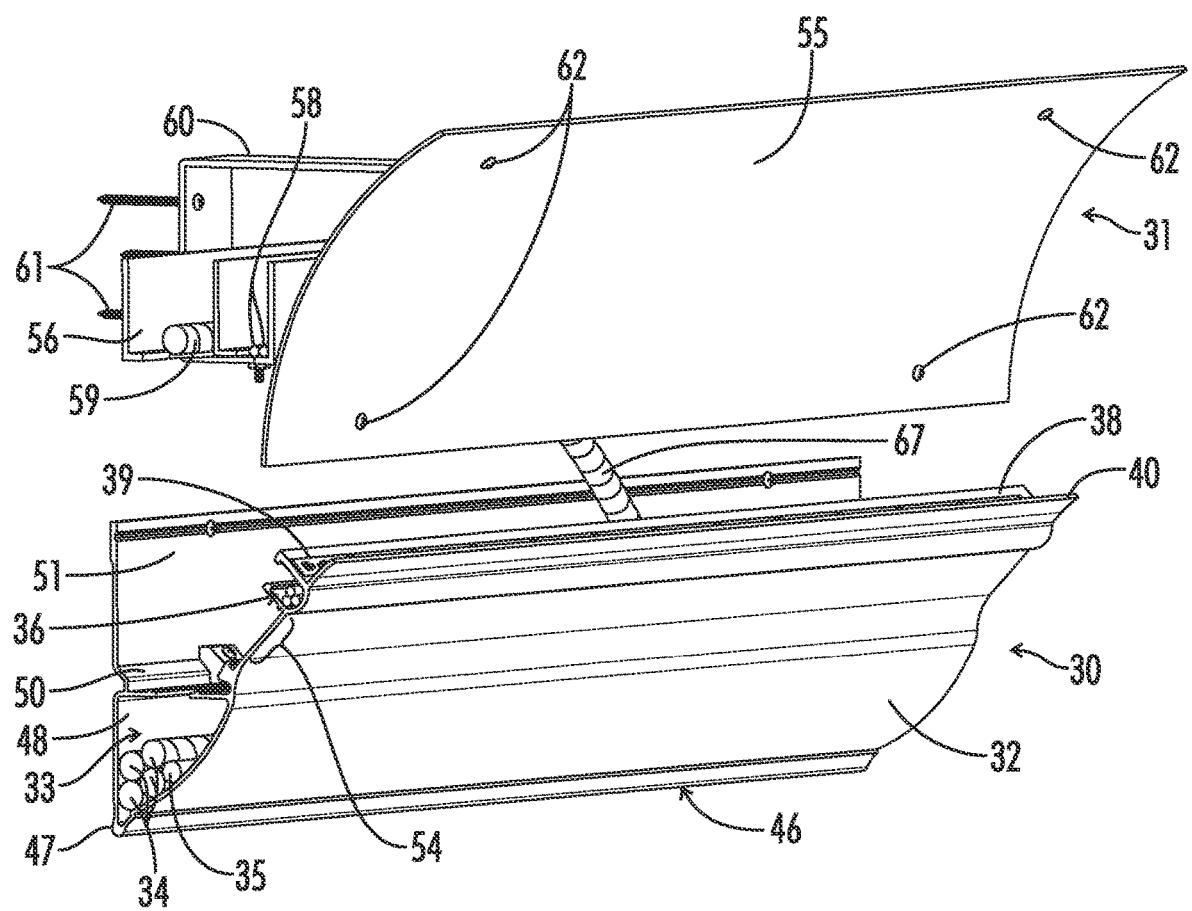
FIG. 2 is a more detailed perspective view of the first embodiment of the present invention further detailing the placement of electrical cables within the crown molding and the concealed cable capacity behind the light reflector, and the communication of those cables between the crown molding and the light reflector.
Figure 6:
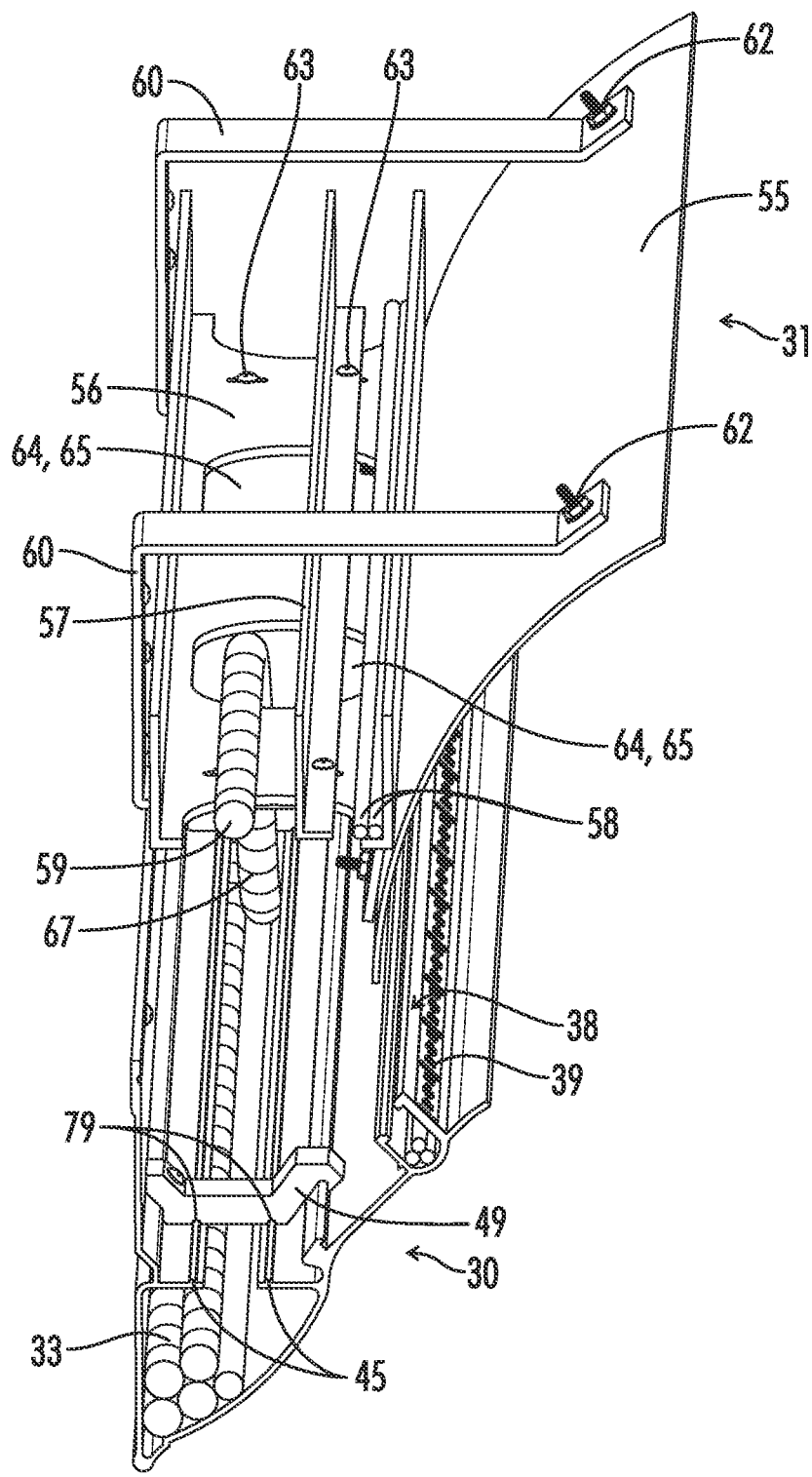
FIG. 6 is a perspective view from the top of the present invention in which the cable tray floor is illustrated showing the entry and exit points for the power and fiber optic cables and, separately, the copper based communications cables from which these cables can safely transfer from or to the crown molding portion of this invention, also illustrating the method whereby the power and fiber optic cables enter the power and fiber optic cable location within the crown molding.

Referring now in particular to light reflector assembly 31, whose structure will be described here and references FIGS. 1-4 and FIG. 6, which illustrate the various components described herein. Assembly 31 includes a light reflector 55 which in an embodiment is comprised of a simple piece of thin sheet metal or plastic, or other inexpensive material whose length is determined by the length of the system to be installed, and whose height, illustrated in profile in FIG. 4, extends from above upper nut and bolt assembly 62 yet some distance below ceiling 69, continuously until it is some distance below lower nut and bolt assembly 62. As illustrated in FIG. 2, light reflector 55 remains some distance above crown molding 30. Light reflector 55 is not a structural component, and accordingly only needs to be strong enough to maintain its smoothly curved shape after it is installed onto brackets 60 using nut and bolt assemblies 62. Holes through light reflector 55 allowing nut and bolt assemblies 62 to pass through can be drilled at the installation site prior to installation, and therefore can be positioned to match the placement of brackets 60 along the length of light reflector 55. Light reflector 55 is also designed to be easily removed by removing nut and bolt assemblies 62, allowing for access to the other components of light reflector assembly 31, or to improve access to any components of crown molding 30. Brackets 60 provide the main support structure of light reflector assembly 31. Brackets 60 are each composed of a single linear piece of a material such as steel, in a width of approximately one inch, that is bent from a straight piece to achieve the contours illustrated in FIG. 4 starting at the upper attachment point where bracket is bent so that the end of bracket 60 is parallel to the desired placement of light reflector 55, and a pre-drilled hole in bracket 60 facilitates installation of the upper portion of light reflector 55 using nut and bolt assembly 62. Bracket 60 then proceeds horizontally to where it meets wall 68, preferably where a vertical framing member is present, then travels vertically down the wall where three fasteners 61 secure bracket 60, through pre-drilled holes, to wall 68. Bracket 60 then proceeds horizontally to where it is bent downwards, to an angle that is parallel to the desired placement of light reflector 60. A pre-drilled hole facilitates installation of light reflector 55 to the lower attachment portion of bracket 60 using nut and bolt assembly 62. The lower horizontal portion of bracket 60 contains pre-drilled holes to facilitate attachment of cable tray 56 and cable tray divider 57 using nut and bolt assemblies 63. Cable tray 56 and cable tray divider 57 are illustrated in profile in FIG. 4 and from above in FIG. 6. Cable tray 56 and cable tray divider 57 are supported by the lower horizontal portion of bracket 60 and are an integral part of light reflector assembly 31 in this first preferred embodiment of the invention. Cable tray 56 is made from a strong material, such as sheet steel, and is bent from a flat sheet with each side of the flat sheet bent up to form the side walls. Cable tray 56 is approximately as long as the installation of light reflector assembly 31. Ventilation and cable access holes are stamped into the floor of cable tray 56 as illustrated in FIG. 6. Attachment holes are either pre-drilled or drilled at installation to match the installed spacing of brackets 60, and facilitate nut and bolt assemblies 63 securing cable tray 56 to the lower horizontal portion of bracket 60. Cable tray divider 57 is made from a singular piece of sheet steel, with one bend to create an attachment portion that, when attachment holes are drilled, facilitates attachment within cable tray 56 sharing one nut and bolt assembly 63 for each bracket 60. The remaining vertical portion of cable tray divider 57 provides a fixed barrier within cable tray 56 to divide the compartment to separate cables. As illustrated in FIG. 6 cable tray divider 57 is installed within cable tray 56 at the outer most attachment point along the lower horizontal portion of bracket 60, creating a smaller cable compartment for copper communications cables 58, and a larger compartment for power cable 59 and additional cables 59 if needed. Cable tray divider also creates separate openings across the stamped ventilation and cable access holes in the floor of cable tray 56. Cable access hole portion 64 allows power cables to access the power cable portion of cable tray 56 from below and cable access hole portion 65 allows copper communications cables access to the communications cables portion of cable tray 56 from below.

Referring now in particular to crown molding 30, whose structure will be described here and references FIGS. 1-3 and FIGS. 5-6, which illustrate the components described herein. Crown molding 30 comprises two major structural sections, a rear section which starts at the top of attachment portion 51 and extends down to the lowest point 46 on the crown molding 30, and a front section which starts at the top of decorative face 32 at top edge 40 and extends down to meet the rear section at lowest point 46 on crown molding 30. Because horizontal members 43 are not continuous, and are separated by a gap 44, the only place where the front and rear sections meet is lowest point 46 of crown molding 30. In an embodiment, crown molding 30 will be made of Fiber Reinforced Polymer (FRP) using a linear process analogous to extrusion called pultrusion. Pultrusion involves pulling reinforcing fibers through a resin bath and a die which produces the profile shape of crown molding 30 in a continuous process. FRP pultruded products can be engineered to have tremendous strength and light weight, both properties which are valuable in crown molding 30. Also, the nature and design of the reinforcing fibers within crown molding can vary across the piece, resulting in different material properties in different locations of the molding, as viewed in profile. One example of that is described in detail in the above referenced U.S. patent application Ser. No. 15/011,474 whereby attachment portion 51 is designed to flex as it is drawn tightly to an irregular wall, while decorative face 32 remains preferentially stiff. FRP and pultrusion can be engineered using standard practices known to those skilled in the art to provide that and any other described properties as part of this first preferred embodiment of the present invention.

Figure 3:
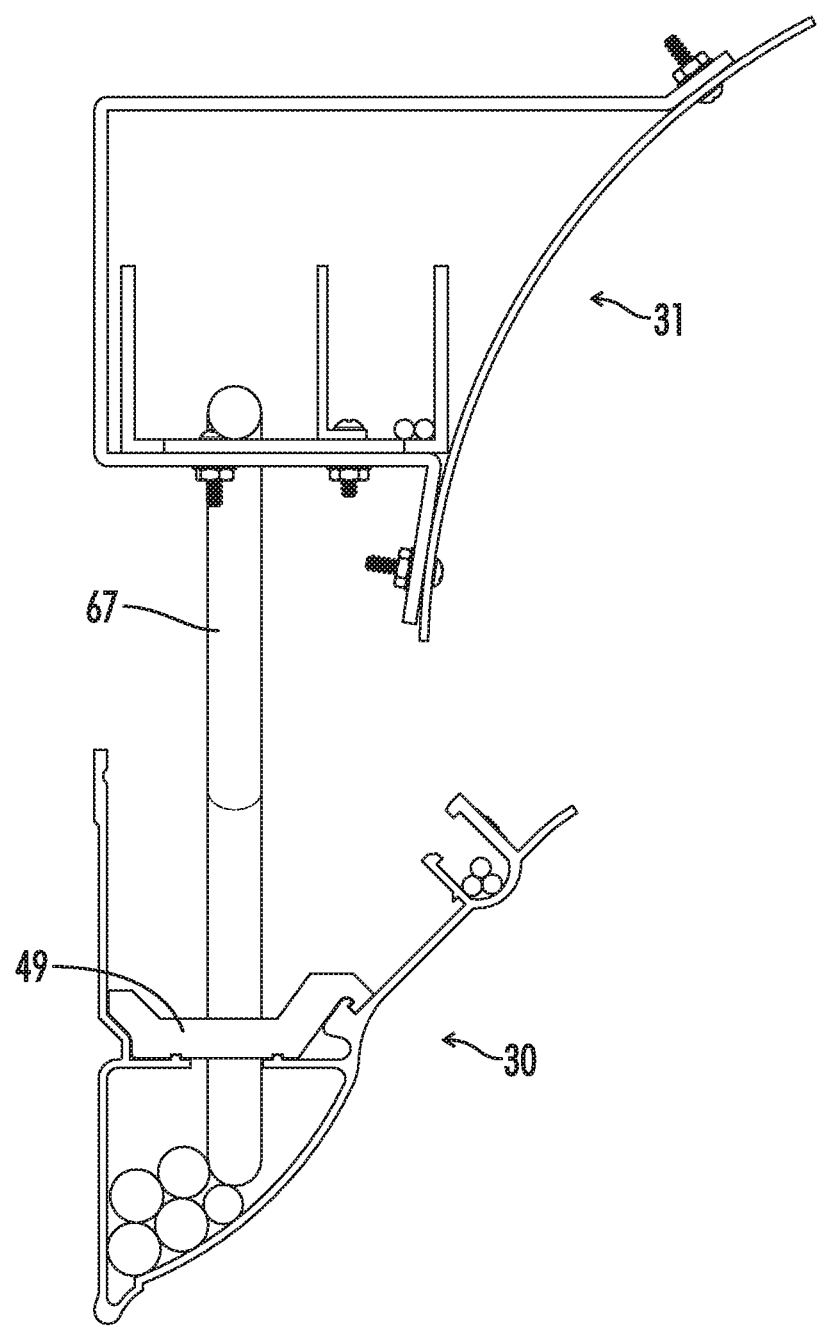
FIG. 3 is a profile view of the embodiment shown in FIGS. 1 and 2 that details the crown molding structure onto which this invention is applied, also illustrating the support mechanism for and location of electrical power and fiber optic cables, and the separately located copper based communications cables within the crown molding, within the concealed location behind the light reflector, and communicated between those two.

FIG. 2 provides a detailed perspective view of crown molding 30 and FIG. 5 provides a detailed profile view of crown molding 30. Both are referenced in the following description of the structure and components of crown molding 30. Attachment portion 51, at the top of the rear section of crown molding 30, is pierced by fastener 52 which is then drawn tightly into a framing member within the wall onto which crown molding 30 is to be installed, securing crown molding 30. In an embodiment, the arrangement of fibers within attachment portion 51 are in only one direction along the length of the molding, allowing the resin matrix to expand and allow penetrating screw 52 to pass through attachment portion 51 safely without fracturing the molding. Upper portion 53 of the rear section of crown molding 30 travels from the bottom of attachment point 51 to the top of bulkhead 50. Bulkhead 50 is favorably angled to accept a screw and provide favorable access for a screw driving tool. FIG. 5 illustrates the use of bulkhead 50 as a secondary installation point for crown molding 30 and as an attachment point for horizontal reinforcing structure 49 within crown molding 30. Horizontal reinforcing structure 49 is employed to reinforce the position of the front section of the molding as described in the inventor's U.S. patent application Ser. No. 15/011,474. Screw 52 travels through horizontal reinforcing structure 49 and bulkhead 50 and into a framing member inside the wall which ensures that lower rear wall contact surface 47 is secured in place against the wall. The arrangement of fibers within bulkhead 50 are in only one direction along the length of the molding, allowing screw 52 to penetrate without damaging bulkhead 50. Bulkhead 50 proceeds down vertically from the favorably angled surface and terminates at the rear-most horizontal member 43. Rear-most horizontal member 43 separates lower compartment 33 from the rest of crown molding 30, comprising the rear portion of its upper boundary. Rear-most horizontal member 43 starts at gap 44 toward the center of crown molding 30 as shown in FIG. 3 and proceeds rearwards horizontally past the termination of the vertical portion of bulkhead 50 and to the rear of crown molding 30 where it ends at the top of lower compartment 33 rear wall 48. Rear wall 48 starts at rear-most horizontal member 43 and proceeds vertically down until it terminates at lowest point 46. Rear wall 48 is also the rear boundary of lower compartment 33. Decorative face 32 starts where rear wall terminates at lowest point 46 on crown molding 30, and travels continuously up along the entire front section until it terminates at top edge 40 at the top of the front section of crown molding 30. Decorative face 32 is continuous and without interruption as it is viewed from within the room within which it has been installed. The interior side of decorative face 32, however, supports various additional structures described here and illustrated in FIG. 2 and FIG. 5. Front-most horizontal member 43 starts at gap 44, toward the center of crown molding 30 as viewed in FIG. 5 and proceeds horizontally away from the wall and gap 44 until it terminates at the interior side of decorative face 32. The underside of front-most horizontal member 43 is also the front portion of the upper boundary of lower compartment 33, and the rear of decorative face 32 from lowest point 46 to front-most horizontal member 43 comprises the front wall of lower compartment 33. As shown in FIG. 5 the upper surfaces of horizontal members 43 each contain an alignment ridge 45, located close to gap 44, but starting some small distance from gap 44. Each alignment ridge, viewed in profile as shown in FIG. 5, is trapezoidal in shape where the top surface of the trapezoid is parallel to the plane concurrent with horizontal members 43, and whose bottom surface of the trapezoid is contiguous and coplanar with the top surface of horizontal members 43. The top surface of the trapezoid comprising alignment ridges 45 when viewed in profile, is narrower than the bottom of the trapezoid, with the sides angled accordingly. Horizontal reinforcing structure 49 contains two corresponding alignment channels 79 which are located, sized and shaped to fit precisely over both alignment ridges 45 when horizontal reinforcing structure 49 is installed as illustrated in FIG. 5, provided gap 44 is precisely its designed width. Although horizontal reinforcing structure 49 and its installation method is described in the inventor's referenced U.S. patent application Ser. No. 15/011,474, alignment ridges 45 on horizontal surfaces 43 and corresponding alignment channels 79 within horizontal reinforcement structure 49 are new to this first preferred embodiment of the present invention. As illustrated in FIG. 5 curved hardware socket 41 starts at the termination of front-most horizontal member 43 which is closest to decorative face 32. Curved hardware socket 41 continues seamlessly from the front-most termination of the flat horizontal upper surface of front-most horizontal member 43 comprising a smoothly curving surface that travels nearly, but somewhat less than, 180 degrees at which point it continues seamlessly into a flat surface that proceeds a short distance toward the rear section of crown molding 30 at a slight angle from horizontal such that the rear-most portion of the flat upper surface of curved hardware socket 41 is situated a slightly greater distance above front-most horizontal member 43 than is the front-most portion of the flat upper surface of hardware socket 41. The upper flat surface of hardware socket 41 concurrently comprises the lower surface of hardware socket reinforcing structure 42. Hardware socket reinforcing structure 42 starts at the upper termination of the curved portion of curved hardware socket 41 and continues as described for concurrent flat upper surface of curved hardware socket 41 until it terminates closer to the center of crown molding 30, where it curves upwards at an angle similar to the decorative face and proceeds to the top most portion of hardware socket reinforcing structure 42 where it forms the lower alignment insert slot present where hardware socket reinforcing structure 42 joins the interior side of decorative face 32. The inner and outer surfaces of decorative face 32 immediately above hardware socket reinforcing structure are not parallel when viewed in profile in FIG. 5. As decorative face 32 proceeds upwards away from hardware socket reinforcing structure 42 the inner and outer surfaces of decorative face 32 transition into a flat parallel area 54 of decorative face 32, within which the inner and outer faces of decorative face 32 remain flat and parallel to each other. Flat parallel area 54 terminates at the lower wall of upper compartment 36. It is noted here that the interior portion of decorative face 32 between hardware reinforcement socket 42 and the lower wall of upper compartment 36 contains the structure for an alignment insert, whose lower slot is also used in the installation of horizontal reinforcing structure 49. The structure and method as well as the utility of the alignment insert slot is thoroughly described in the inventor's U.S. patent application Ser. No. 15/011,474 and as its utilization and structure within this preferred embodiment of this invention is the same, is not described here. The lower wall of upper compartment 36 protrudes directly and orthogonally from the interior side of decorative face 32 and terminates at a point which concurrently defines the lower termination of upper compartment 36. A notch feature protrudes within upper compartment 36 and is built into the lower wall of upper compartment 36 at its termination away from decorative face 32. Decorative face 32 curves outwardly and then back as it proceeds from the lower wall of upper compartment 36 to where it meets the upper wall of upper compartment 36. The portion of decorative face 32 between the lower and upper walls of upper compartment 36 concurrently comprises the outer wall of upper compartment 36. The upper wall of upper compartment 36 protrudes directly and orthogonally from the interior side of decorative face 32, and terminates at a point which concurrently defines the upper termination of upper compartment 36. A notch feature protrudes within upper compartment 36 and is built into the upper wall of upper compartment 36 at its termination away from decorative face 32. The upper wall of upper compartment 36 is a demonstrably more substantial structure than the lower wall of upper compartment 36, and the side of the upper wall opposite upper compartment 36 concurrently serves as lighting location 38. Decorative face 32 proceeds from where the upper wall of upper compartment 36 protrudes to its termination at upper edge 40.

Figure 7:
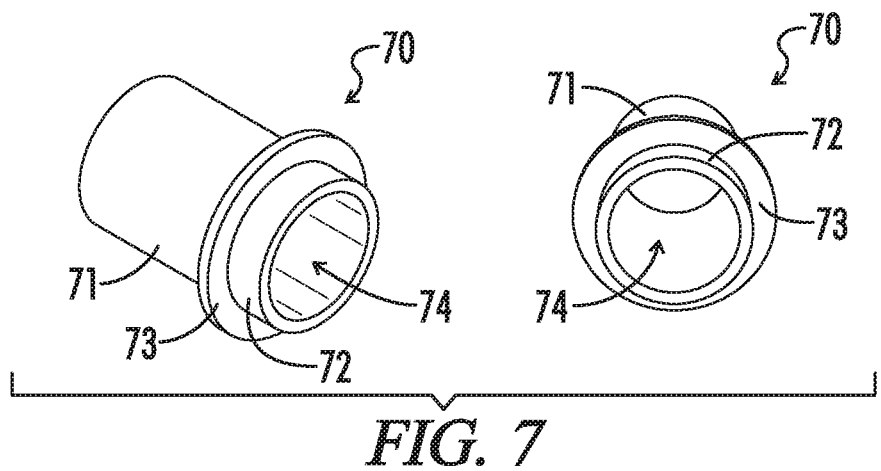
FIG. 7 provides two views of an abrasion protection cylinder with a locating washer, a component of a preferred embodiment of the present invention, which locates the cylinder such that the long portion of the cylinder protrudes through a hole in the vertical rear member of the crown molding and through the wall and into the wall space between framing members, and the shorter portion of the abrasion protection cylinder protrudes through a hole in either the installed equipment into which one or more cables is safely routed, or through an installed vertical locating bracket through which the cable is safely routed into the open space within the crown molding.

Referring now in particular to FIG. 7 of the first preferred embodiment of the present invention, where two views of the same long cylinder 70 are illustrated. Long cylinder 70 is formed from a somewhat flexible and elastic material such as vulcanized rubber or one of any number of formulations of polymers and other plastics which are known in the art. The relationship between the material properties of strength to hold its original shape, flexibility to deform as needed at installation and the elasticity to return to its original molded shape once installed will be such that long cylinder 70 can reliably return to its molded shape after installation, and yet remain somewhat flexible, especially at the far ends of the cylinder. Once a suitable polymer or rubber material is chosen based on standard materials properties know in the art, long cylinder 70 is injection molded into a cylinder whose inner diameter is consistent from end to end, and provides a protected cable path 74 without interruption. The outer diameter of long cylinder 70 is also constant from end to end, except where it is interrupted by locating washer 73. Locating washer 73 is formed as an integral part of long cylinder 70, and divides the cylinder into long portion 71 and short portion 72.

Figure 8:
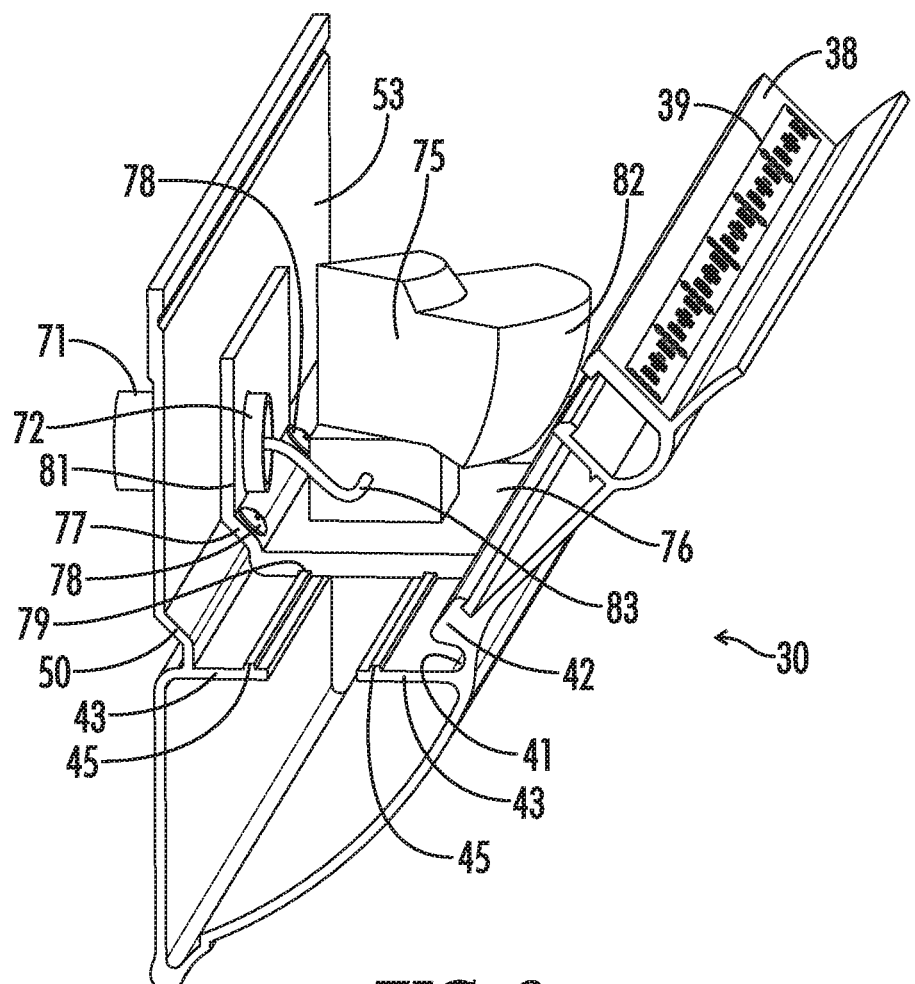
FIG. 8 is a side profile perspective view of the crown molding of the present invention in which a piece of equipment is mounted securely within the crown molding and its cable is safely routed into the wall through an abrasion protection cylinder whose locating washer is compressed between the vertical rear member of the crown molding and the vertical rear member of the installed equipment, also visible are the alignment ridges on either side of the gap within the horizontal member of the crown molding and the corresponding channels in the bottom surface of the installed equipment which ensure the proper size of the gap and prevent equipment installation if the gap widens.
Figure 9:
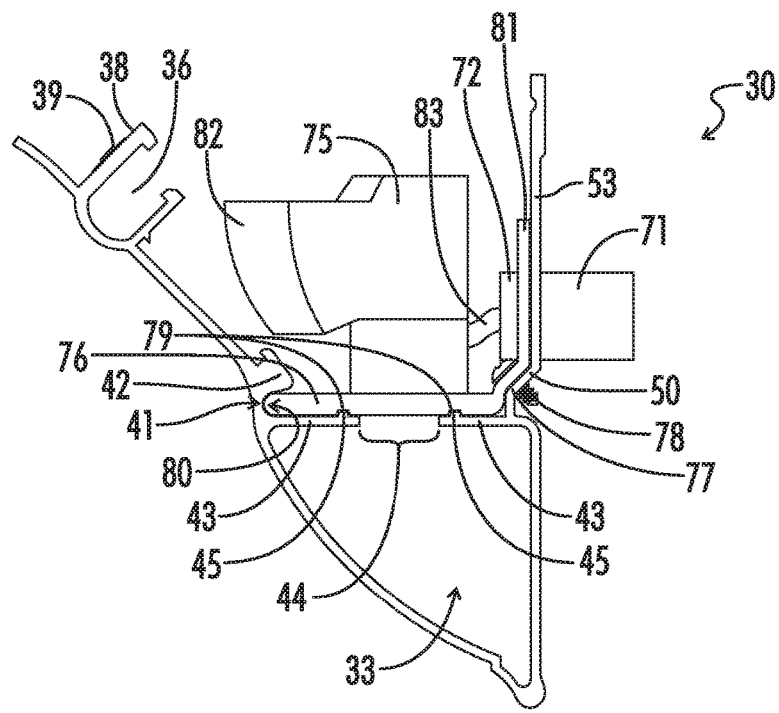
FIG. 9 is a profile view of a preferred embodiment of the present invention detailing the method by which equipment is installed and secured within the crown molding including the curved hardware socket behind the decorative face of the molding and corresponding hardware pivot on the equipment which together facilitate installation of the equipment and, along with the accompanying alignment ridges in the molding and corresponding alignment channels within the equipment, ensure accurate and secure placement using standard screws at the rear of the molding, which are angled favorably for tool use and to avoid entering the lower cable compartment.
Figure 10:
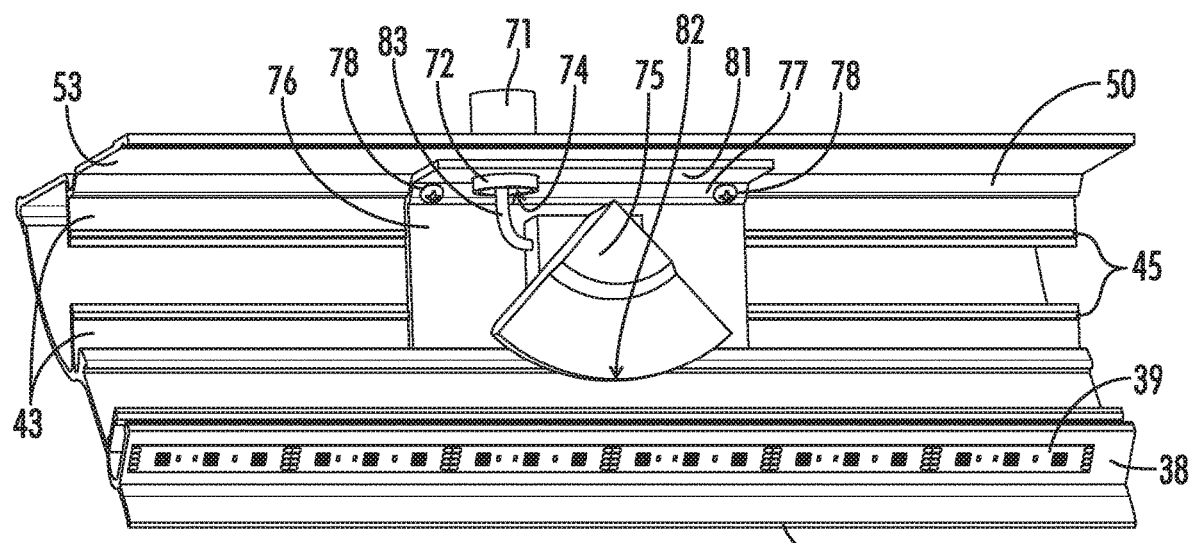
FIG. 10 is a view from above of a preferred embodiment of the invention providing another view of installed equipment which shows the favorable location of the screws which anchor the equipment accurately and securely within the crown molding and also illustrating how the equipment cable passes safely through holes in the equipment, crown molding and wall through a properly located and secured abrasion protection cylinder.

Now referring in particular to FIGS. 8-10 of the first preferred embodiment of this invention. FIG. 8 provides in a perspective view an assembly of crown molding 30 with location beacon 75 and long cylinder 70 installed on horizontal members 43. FIG. 9 provides a profile view of the same assembly and FIG. 10 provides a view of the same assembly from above. The structure of crown molding 30 as illustrated in FIGS. 8-10 is the same as is described above. The structure of long cylinder 70 is also the same as is described above, with locating washer 73 located between vertical portion 81 of location beacon 75 and upper portion 53 of the rear section of crown molding 30. Location beacon 75 is comprised of a main body portion, which is mounted securely to, or molded contiguously with, hardware platform 76. Antenna 82 is an integral component of location beacon 75 and is positioned within location beacon 75 such that it can send and receive signals through the upper portion of the front section of crown molding 30 that is above horizontal members 43. Cable 83 carries communications and power to facilitate the operation of location beacon 75. Cable 83 starts at the main body portion of location beacon 75 and travels through protected cable path 74 of long cylinder 70 and into the wall onto which crown molding 30 is installed. Hardware platform 76 is formed from a high strength material, such as one of many high strength plastics, and is designed so that it does not flex or otherwise deform as it is installed within crown molding 30 nor during its use thereafter.

Hardware platform 76, as viewed in profile in FIG. 9, whose top surface of the outer-most horizontal portion of hardware platform 76 starts at the termination of the lowest vertical front-facing portion of the body of location beacon 75, where the body portion of location beacon 75 joins hardware platform 76, proceeds horizontally until it terminates at the top-most portion of hardware platform pivot 80, which is curved to precisely mate with the slightly-less-than-180-degrees curved portion of curved hardware socket 41 on the interior of the front section of crown molding 30. Hardware platform pivot 80 starts at the termination of the top surface of the outer-most portion of hardware platform 76 and travels through a curve of precisely 180 degrees, in a manner that mates precisely with the curved portion of curved hardware socket 41, and terminates at the transition from the bottom of the curve of hardware platform pivot 80 to the bottom horizontal surface of hardware platform 76. The bottom surface of hardware platform 76 proceeds horizontally from the bottom termination of the curve of hardware platform pivot 80 until it meets the bottom of the front-most alignment channel 79, whose trapezoidal shape mates precisely with the similarly trapezoidal alignment ridge 45 on front-most horizontal member 43. The bottom surface of hardware platform 76 proceeds horizontally from the bottom of the opposite side of front-most alignment channel 79 to the bottom of the rear-most alignment channel 79, whose trapezoidal shape precisely mates with the similarly trapezoidal alignment ridge 45 on rear-most horizontal member 43. The bottom surface of hardware platform 76 proceeds from the bottom of the opposite side of rear-most alignment channel 79 until curves upwards and away from rear-most horizontal surface 43 and terminates at the vertical portion of bulkhead mating portion 77. The structure of hardware platform 76 is such that the surface of hardware platform 76, from the top of hardware platform pivot 80 to the rear-most portion of the bottom horizontal surface of hardware platform 76 which curves away from rear-most horizontal member 43, mates directly against the curved portion of curved hardware socket 41 and directly against all upward facing surfaces along both horizontal members 43 except across gap 44 where horizontal members 43 are absent, including mating directly against all 3 sides of alignment ridges 45. The vertical portion of bulkhead mating portion 77 of hardware platform 76 proceeds vertically, as viewed in profile in FIG. 9 of the first preferred embodiment of the present invention, from the termination of the bottom surface of hardware platform 76 vertically and against the interior surface of the vertical portion of bulkhead 50 within crown molding 30, where it then curves to mate against the favorably angled portion of bulkhead 50. Bulkhead mating portion 77 of hardware platform 76 terminates where it meets the lowest most portion of vertical member 81 of hardware platform 76, and vertical member 81 proceeds vertically and mated against upper portion 53 of the rear section of crown molding 30, where it terminates at the upper edge of vertical member 81 of hardware platform 76. As illustrated in FIGS. 8-10, vertical member 81 has a hole sized to allow short portion 72 of long cylinder 70 to pass through, but of a smaller diameter than locating washer 73 which is illustrated in FIG. 7. Upper portion 53 of the rear section of crown molding 30 has a corresponding hole sized to allow long portion 71 of long cylinder 70, but of a smaller diameter than locating washer 73. The rear surface of vertical member 81 of hardware platform 76 includes a relief depression in the rear surface centered around the hole that mates with locating washer 73 resulting in partial compression of locating washer 73 as vertical member 81 is mated against upper portion 53 of crown molding 30 with long cylinder 70 through both holes and locating washer 73 between vertical member 81 and upper portion 53. A single screw 78 penetrates the favorably angled portion of bulkhead mating portion 77 of hardware platform 76 and penetrates the favorably angled portion of bulkhead 50 of crown molding 30 when viewed in profile in FIG. 9, and two separate screws 78 installed in the same manner, as viewed in FIG. 8 and FIG. 10, structurally complete the assembly of crown molding 30, location beacon 75 and long cylinder 70 as illustrated in FIGS. 8-10 in the first preferred embodiment of the present invention.

The particular design and structure of the main body portion of location beacon 75 excluding hardware platform 76, as it relates to the first preferred embodiment of the present invention, is limited to providing an integral antenna that is structured so that it can send and receive signal through the upper portion of the front section of crown molding 30 above horizontal members 43, and whose structure is at least some distance removed from all structures which are part of the interior portion of the upper portion of crown molding 30 above curved hardware socket 41 where that distance between both the main body portion of location beacon 75 and any interior structures including decorative face 32, and distance between antenna 82 and any interior structures including decorative face 32, is at least sufficient to allow proper placement of hardware platform 76 onto horizontal surfaces 43 during installation and thereafter.

Figure 11:
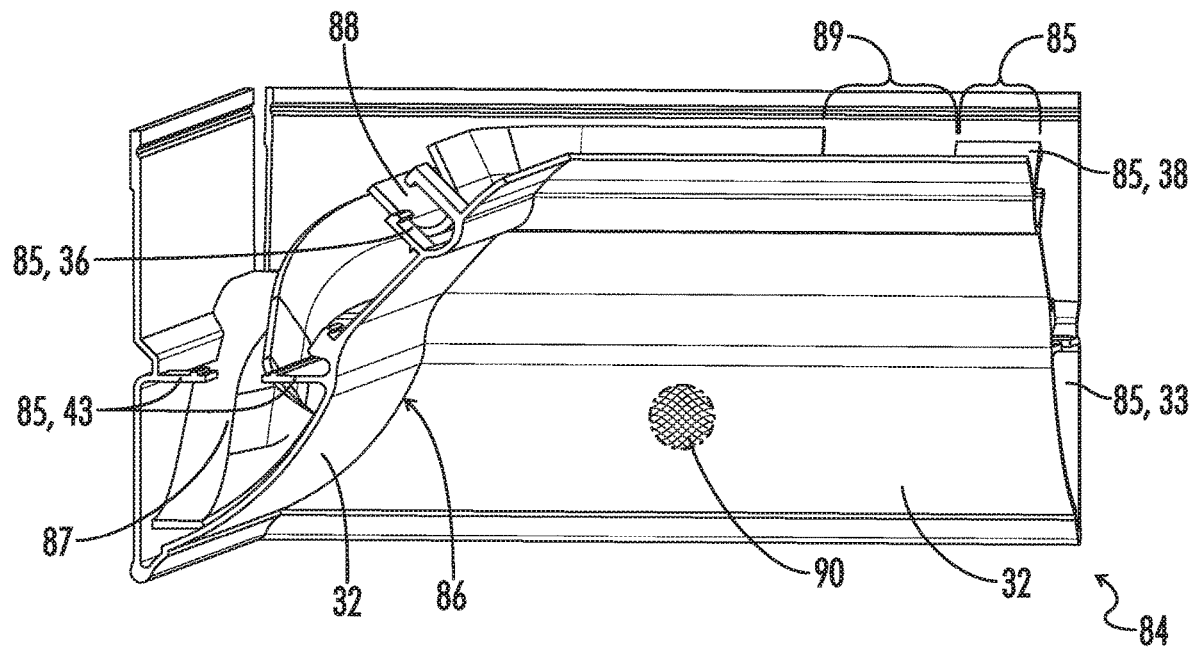
FIG. 11 is a side perspective view of an inside corner assembly of the invention which enables the joining of two straight sections of crown molding and the safe communication of the included cables from one straight section through the illustrated inside corner to the other by providing smooth curved cable paths of differing radii that inherently prevent damaging sharp bends, and also by a design of the reinforcing fibers within the decorative face of the crown molding which are engineered to enable the decorative face of the crown molding to fracture upon inappropriate penetration, and whose fiber design for fracture can be incorporated throughout all pieces of this embodiment.
Figure 12:
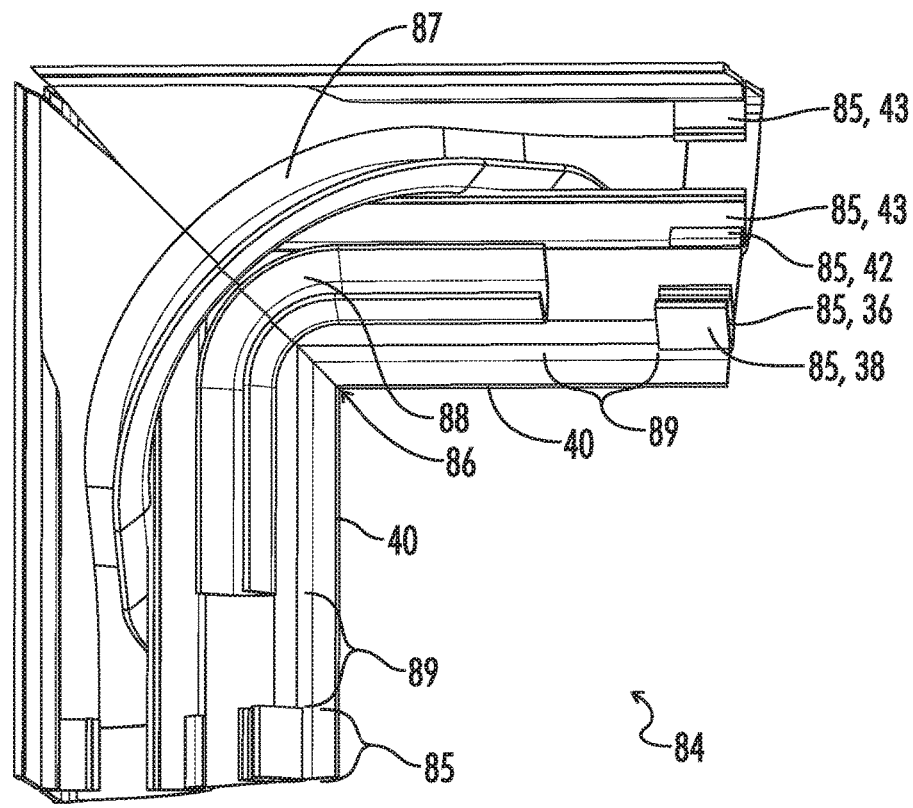
FIG. 12 is a view from above of the inside corner assembly shown in FIG. 11 which illustrates the larger radius of the curve for power cables and fiber optic cables and the smaller radius curve that is required for copper based communications as well as the area designed to mate directly with the straight sections, as well as the transitions from the straight cable paths to the curved cable paths and the maintained segregation of the two cable paths.
Figure 13:
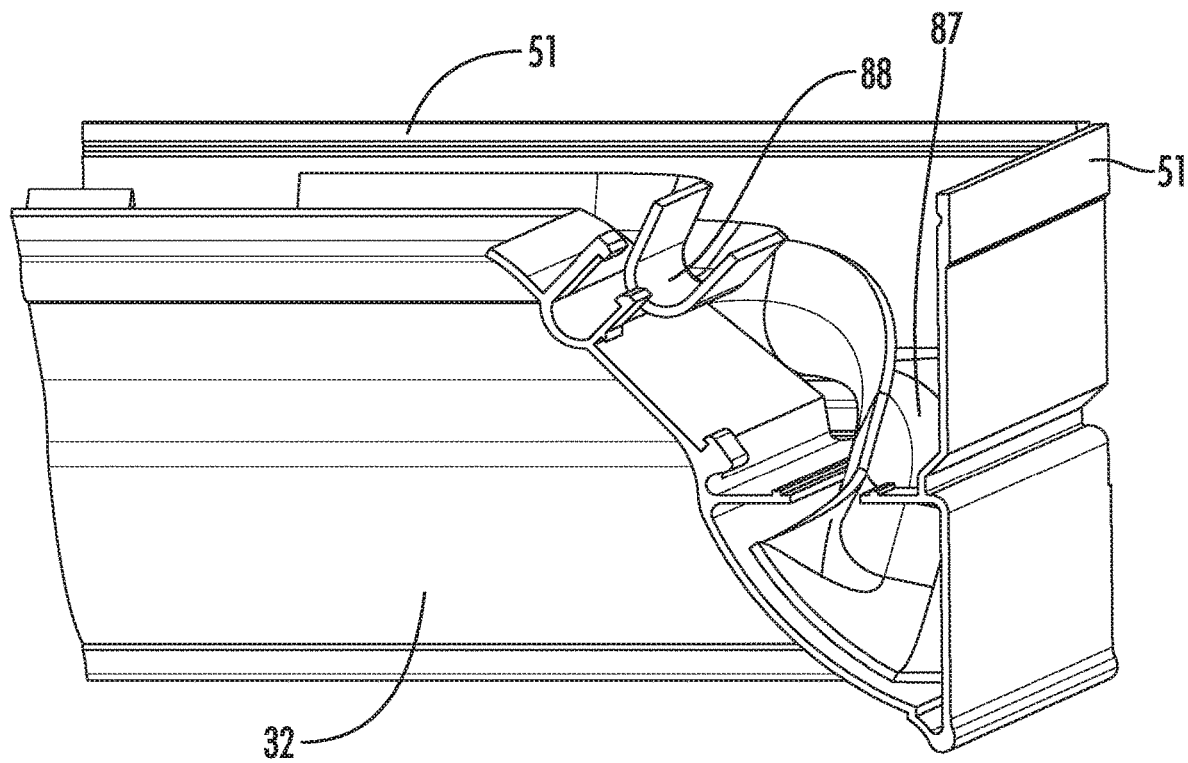
FIG. 13 is another side perspective view of inside corner assembly which illustrates the raised center portion of the larger radius cable path with allows for an increased radius of curve within the crown molding profile while the sharply angled junction of decorative faces is maintained and appears to the room as a traditional mitered crown molding intersection.

In particular now referring to FIGS. 11-13 of the first preferred embodiment, where inside corner 84 is shown in several different views. FIG. 11 is a side perspective view of inside corner 84. FIG. 12 is a view from above inside corner 84. FIG. 13 is a side perspective view from a different angle that that illustrated in FIG. 11. The structure of inside corner 84 is a similar composite of fiber reinforced polymer (FRP) to crown molding 30 or may be formed of a suitable other plastic polymer with similar properties, however because of the non-linear nature of inside corner 84, a molding process known in the art to manufacturers of FRP products and other plastics may be used to mold inside corner 84 in several parts which are later assembled to form inside corner 84. Alternatively, inside corner 84 could be manufactured using iterative or 3d printing processes, which are capable of printing complex parts such as inside corner 84 without assembly. Whichever method of manufacture is chosen, the current state of the art of manufacturing can be employed to manufacture inside corner 84. The properties of inside corner as a molding system are described in the inventor's U.S. patent application Ser. No. 15/011,474, and are applied in the same way to the structure of inside corner 84. The structure as it relates to the first preferred embodiment of this invention is described here. There are three structural profile sections which comprise the structure of inside corner 84 as it relates to the first preferred embodiment of the present invention. Profile section 85 is a section of short length which starts at each end of inside corner 84, and travels a short distance along inside corner 84 terminating at the beginning of transition section 89. Profile section 85 has features which are exactly similar and matching to crown molding 30, both inside crown molding 30 and along decorative face 32. Profile section 85 matches exactly the structure in profile of crown molding 30 to facilitate joining sections of crown molding 30 to each end of inside corner 84. Transition section 89 travels a short distance starting at the termination of profile section 85 and terminating where each transition section meets the singular third profile section which is hereafter referred to as the curved path section, which comprises the remainder of the molding section of inside corner 84 between both transition sections 89. Crown molding 30 contains internal structures in addition to lower compartment 33 and upper compartment 36. The only structural pieces that relate to this first preferred embodiment of the present invention and remain within the curved path section of inside corner 84 to serve the purpose of the present invention are cable paths 87 and 88. Cable path 87 starts at the termination of profile section 85 and proceeds through transition section 89 and continues through the curved path section, entering the other transition section 89 travelling through and terminating at the other profile section 85. The structure of cable path 87 is such that there are no corners within cable path 87, and no bends sharper than a minimum radius of approximately 4 inches. As described in the inventor's U.S. patent application Ser. No. 15/011,474 a connector insert is inserted a short distance into lower compartment 36 of a crown molding 30 section, that is to be joined to one of the inside corner profile sections 85, which remaining portion of the connector insert is inserted into profile section 85 of the inside corner, thereby ensuring alignment of the lower portion of decorative faces 32 where they abut. The beginning portion of cable path 87, from its start where profile section 85 meets transition section 89, starts to separate from the interior side of decorative face 32 curving smoothly away from the interior side of decorative face 32 both as the upper edge of cable path 87 climbs steadily higher within the interior of inside corner 84 until it smoothly transitions into the curved path section providing a large radius cable path 87. At the same time as the upper edge of curved path 87 moves smoothly upwards and inwards away from decorative face 32 within transition section 89, the lower floor of cable path 87 similarly moves smoothly higher within transition section 89. The structural height of cable path 87 continues to rise until it peaks in the corner of inside corner 84. This smoothly raised cable path 87 is thereby enabled to provide a smoothly curving cable path starting from lower compartment 33 within an abutting crown molding 30, through a transition zone and into an elevated smooth curve of large radius that then transitions smoothly back down and into lower compartment 33 of the other abutting crown molding 30. Cable path 88 provides a cable path within inside corner 84 with no bends sharper than a small radius of approximately one inch that transitions cables within upper compartment 36 of a section of crown molding 30 that abuts an inside corner 84, through inside corner 84 and back into upper compartment 36 of another section of crown molding 30 which abuts the other side of inside corner 84. Cable path 88 has no structure within transition section 89 and begins abruptly at the end of transition section 89 and provides a smooth cable path whose bends are no sharper than a radius of approximately one inch. When viewed in profile, curved path 88 starts at its upper edge and travels towards the interior side of decorative face 32 and curves smoothly at the interior side of decorative face 32 and proceeds away from the interior side of decorative face 32 where it terminates at its lower edge. Decorative faces 32 of inside corner 84 meet in what appears to be a perfectly mitered junction of two straight sections of crown molding 30 when viewed from the room, although they are contiguous as one part of the molded, 3d printed or otherwise manufactured inside corner 84. Fiber structure 90 provides a representation of what the fiber structure within an FRP manufactured decorative face 32. Although fiber structure 90 is represented in FIG. 11 on one decorative face 32 of inside corner 84, the fiber structure will be present throughout the structure of all decorative faces 32, including crown molding 30, throughout this first embodiment of the present invention. Fiber structure 90 indicates a fiber structure with increased directionality than what would otherwise be present in an FRP piece. The purpose of increased directionality of reinforcing fibers is to prevent decorative face 32 from expanding around the point of insertion of a nail or screw thereby causing decorative face 32 to fracture in a manner that renders the damaged section of either crown molding 30 or inside corner 84 unable to hold the fastener and thereby protecting cables and other items and structures behind decorative face 32 from damage.

The structure of crown molding 30, light reflector assembly 31 and inside corner 84 has been described in this first preferred embodiment of the present invention. Crown molding 30, light reflector assembly 31 and inside corner 84 are the only three items detailed in the figures, where the three provide a representative and detailed view of the characteristics of this first preferred embodiment of this invention. However, they are not meant to be limiting by their inclusion. For example, the same principles of this first embodiment of this invention which are described in FIGS. 11-13 in view of inside corner 84, can be directly applied to an outside corner of the same system, where the curved cable paths protect cables from being pulled against the sharp corner of the wall instead of against the sharp corner of intersecting decorative faces, as does inside corner 84.

Figure 14:
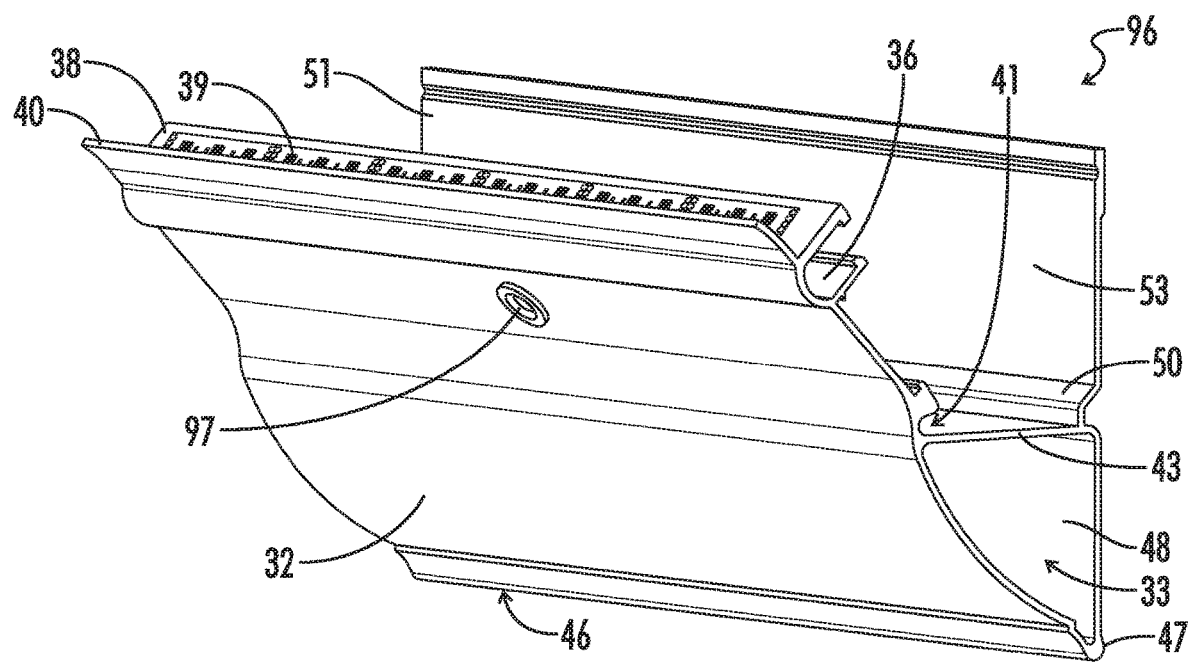
FIG. 14 is a perspective view of another embodiment of the crown molding assembly of the present invention in which the horizontal member is not divided but is continuous from the decorative face to the rear of the crown molding, also illustrated are the similar cable locations as well as illustrating a camera mounted through the defined area of flat and parallel planes for the front and rear of the decorative face.
Figure 15:
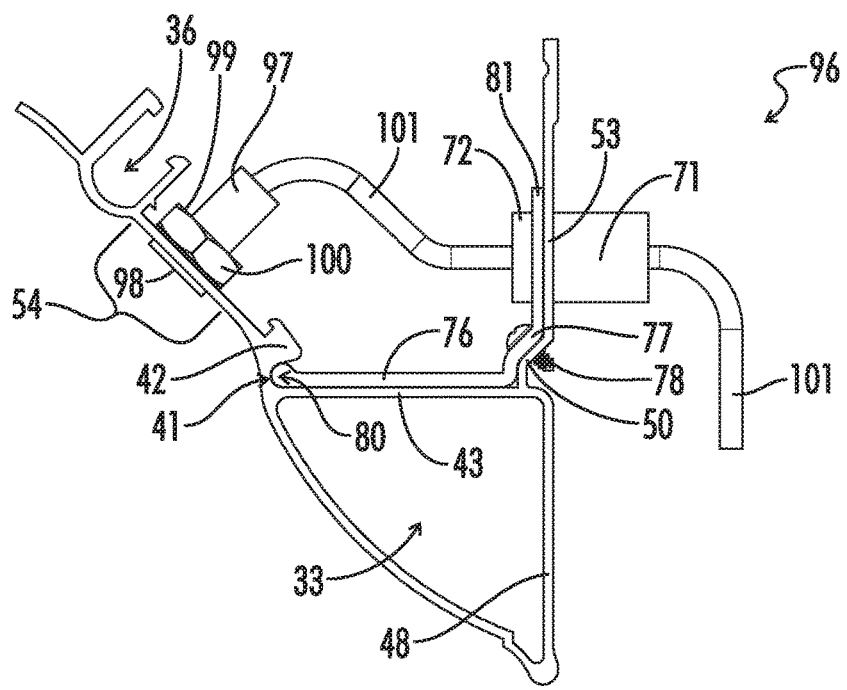
FIG. 15 is a profile view of the embodiment shown in FIG. 14 which shows the similar method of installing hardware, without the gap in the horizontal member and corresponding alignment ridges and channels, but using the same curved hardware socket behind the decorative face of the crown molding and corresponding curved pivot on the hardware to be installed, which is then secured by the favorably angled screws at the rear of the molding, also illustrated is the nut which is threaded onto the body of the camera and tightened against the rear of the decorative face which is parallel in the plane to the front of the decorative face in that section and enables a stable and secure positioning.

Referring now in particular to FIGS. 14 and 15 which illustrate a second preferred embodiment of the present invention where FIG. 14 provides a perspective view of an assembly of crown molding 96, camera 97, hardware platform 76, and long cylinder 70 where long cylinder 70 and hardware platform 76 are concealed. FIG. 15 provides a profile view of an assembly of crown molding 96, camera 97, hardware platform 76 and long cylinder 70. The structure of crown molding 96 is largely similar in the design of its structures and decorations, yet the elimination of gap 44 resulting in a single continuous horizontal member 43 has a large impact on the use of this second preferred embodiment of the present invention. In addition to the elimination of gap 44 and resulting singular continuous horizontal member 43, alignment ridges 45 are eliminated. Apart from the elimination of gap 44 resulting in singular continuous horizontal member 43 and the elimination of alignment ridges 45, the structure of crown molding 96 is as defined for crown molding 30 in the first preferred embodiment. Hardware platform 76 in this second preferred embodiment of the present invention is mostly the same with respect to structure as hardware platform 76 as described in the first embodiment of the present invention. Alignment channels 79 have been eliminated, as has location beacon 75. In addition, the horizontal portion of hardware platform 76 is thinner, when viewed in profile in FIG. 15. The upper surface of the horizontal member of hardware platform 76 proceeds from the upper termination of hardware platform 80 toward the rear section of crown molding 96 angled downward toward horizontal member 43 until it reaches the reduced thickness of the horizontal member of hardware platform 76, at which point the upper surface of the horizontal member of hardware platform 76 proceeds rearward parallel to the bottom surface of the horizontal member of hardware platform 76 until it terminates at the bottom of the vertical portion of bulkhead mating portion 77. The remaining structure of hardware platform 76 in this second preferred embodiment of the present invention, as illustrated in FIGS. 14 and 15, is as described for hardware platform 76 in the first embodiment of the present invention. The structure of long cylinder 70, as well as its placement within the assembly with respect to hardware platform 76 and crown molding 96 is the same as is described for long cylinder 70, as well as its placement within the assembly of crown molding 30 and hardware platform 76 in the first embodiment of this invention. As illustrated in FIG. 15 of the present invention, power and communications cable 101 provides power and communications using a common protocol such as Power over Internet to camera 97, and then travels through protected cable path 74 and into the interior wall space.

Figure 16:
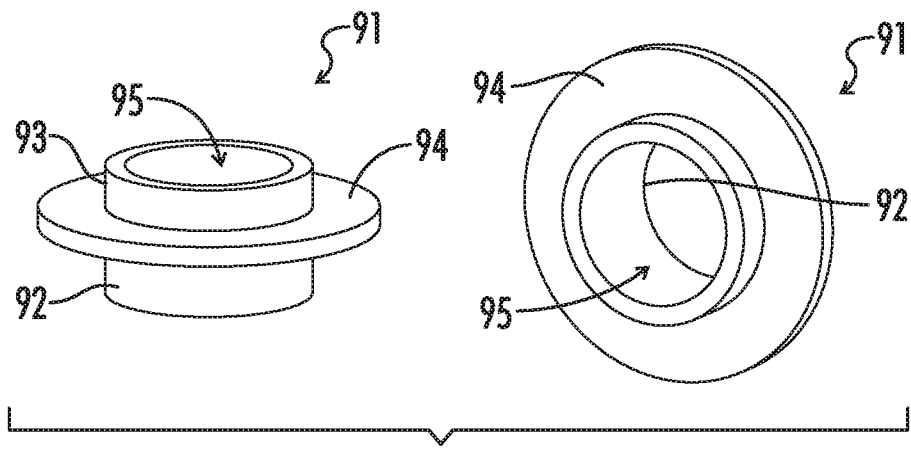
FIG. 16 provides two views of an abrasion protection cylinder with a locating washer which locates the cylinder such that the lower portion of the cylinder as seen in the left view protrudes through the continuous horizontal member of this alternative embodiment of the present invention and into the lower cable compartment, and the upper portion protrudes either to the interior of an installed piece of equipment or through a bracket designed to locate and secure the abrasion protection cylinder and safely into the open portion of the crown molding, while the locating washer is compressed underneath the installed equipment or bracket.

Now referring in particular to FIG. 16 of the second preferred embodiment of the present invention wherein two views of the same short cylinder 91 are presented. Short cylinder 91 is formed from a somewhat flexible and elastic material such as vulcanized rubber or one of any number of formulations of polymers and other plastics which are known in the art. The relationship between the material properties of strength to hold its original shape, flexibility to deform as needed at installation and the elasticity to return to its original molded shape once installed will be such that short cylinder 91 can reliably return to its molded shape after installation, and yet remain somewhat flexible, especially at the far ends of the cylinder. Once a suitable polymer or rubber material is chosen based on standard materials properties know in the art, short cylinder 91 is injection molded into a cylinder whose inner diameter is consistent from end to end, and provides a protected cable path 95 without interruption. The outer diameter of short cylinder 91 is also constant from end to end, except where it is interrupted by locating washer 94. Locating washer 94 is formed as an integral part of short cylinder 91, and divides the cylinder into a short portion 93 and long portion 92, where long portion is only moderately longer than short portion 93.

Figure 17:
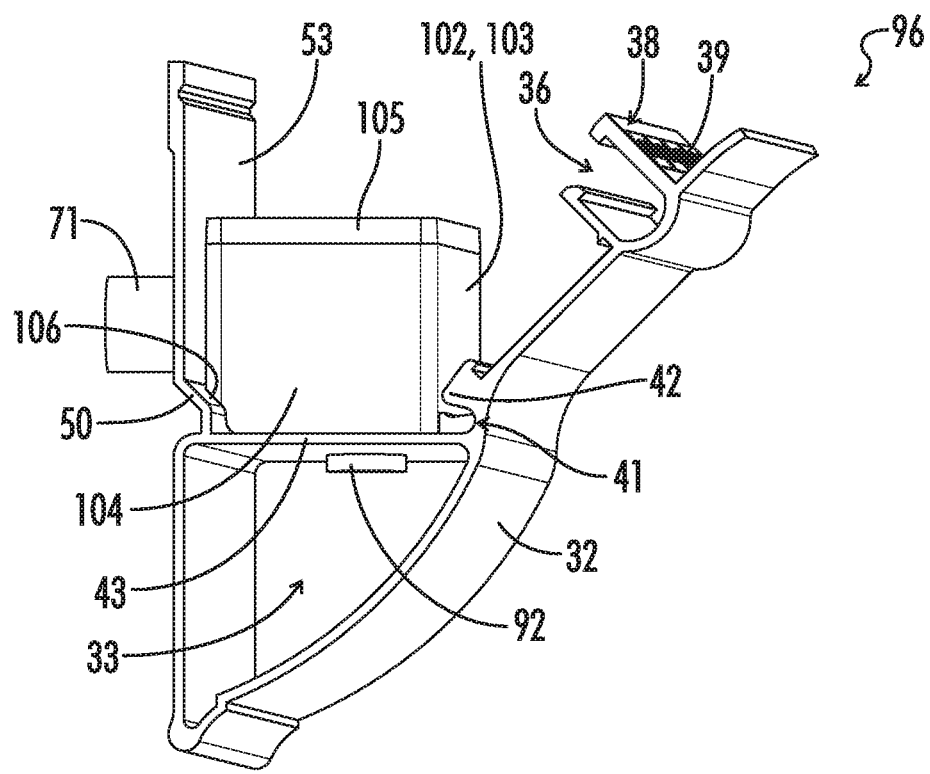
FIG. 17 is a perspective view of an alternative embodiment of the invention including an enclosed electrical box with removable lid also showing the placement and installation of abrasion protection cylinders so that electrical cables can safely enter or exit the electrical box from the wall and can safely transfer between the electrical box and the lower cable compartment, also illustrated are the LED lighting location and separate copper communications cables location.
Figure 18:
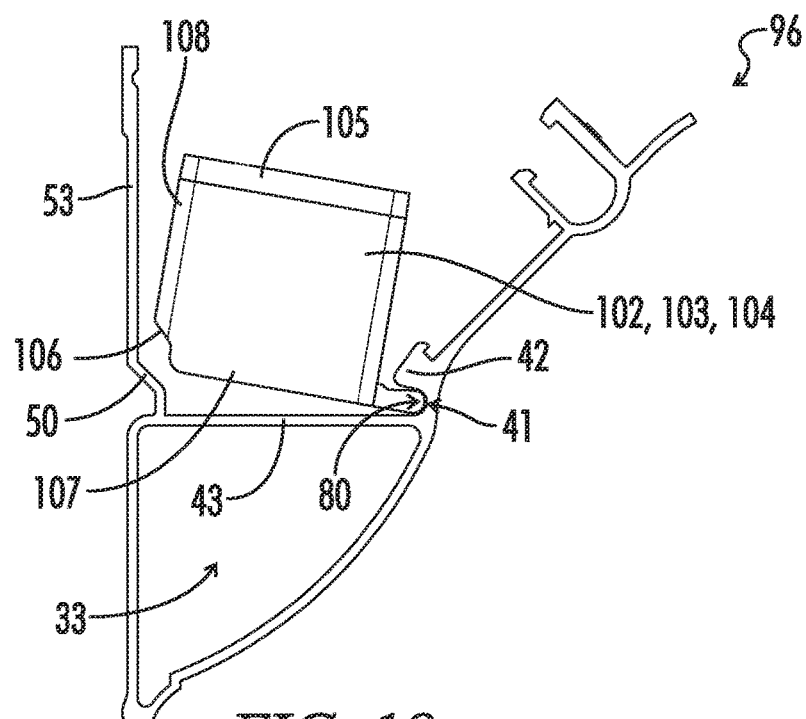
FIG. 18 is a profile view showing an electrical box as it is pivoted into place with the curved hardware socket behind the decorative face of the crown molding and the corresponding pivot on the electrical box positively prevent the outer portion of the underside of the electrical box toward the decorative face from lifting away from the top of the horizontal member of the crown molding during installation, which is particularly important when the locating washer of an abrasion protection cylinder is being installed and will be necessarily compressed during proper installation.

Now referring in particular to FIGS. 17 and 18 of the second preferred embodiment of this invention, where FIG. 17 illustrates a perspective view of an assembly of crown molding 96, electrical container 102, long cylinder 70 and short cylinder 91. FIG. 18 provides a profile view of crown molding 96 and electrical container 102 where electrical container 102 is pivoting within the crown molding, as in during installation of electrical container. Cylinders 70 and 91 are not illustrated within FIG. 18. Electrical container 102 hardware pivot 80, the bottom surface of bottom wall 107, the outer surface of bulkhead mating portion 106 and the rear surface of rear wall 108 all mate with crown molding 96 as described previously for hardware platform 76, with an additional provision for a hole in both bottom wall 107 of hardware container 102, and a corresponding hole through horizontal member 43 of crown molding 96, and a relief area around the hole on the bottom surface of bottom wall 107 to enable partial compression of locating washer 94 of short cylinder 91 whereby locating washer 94 is located between the bottom surface of bottom wall 107 and the top surface of horizontal member 43 as illustrated in FIG. 17. Electrical container 102 structure includes a short horizontal member by which hardware pivot 80 is attached to front wall 103. This structure comprises a bottom surface which seamlessly continues the bottom surface of bottom 107 of electrical container 102 which proceeds horizontally until it terminates at the bottom of hardware pivot 80. Hardware pivot 80 curves from the horizontal bottom surface through slightly more than 180 degrees in a manner that mates precisely with curved hardware socket 41 of crown molding 96, at which point hardware pivot 80 terminates and seamlessly transitions to the flat upper surface of the short horizontal portion where it proceeds toward front wall 103 at a slight downward angle, curving upwards to provide a thicker short horizontal member where it then terminates where it contiguously intersects front wall 103. Electrical container is further comprised of side walls 104 and a removable lid 105. Electrical container 102 may be manufactured from any suitable material that is strong and will not flex, particularly at the short horizontal member which connects and locates hardware pivot 80. There may be uses of electrical container 102 for which the National Electrical Code calls for electrical container 102 to be constructed of metal, in which case electrical container 102 may be manufactured from metal such as stamped and formed steel using methods known in the art, to form the structure described herein.

Figure 19:
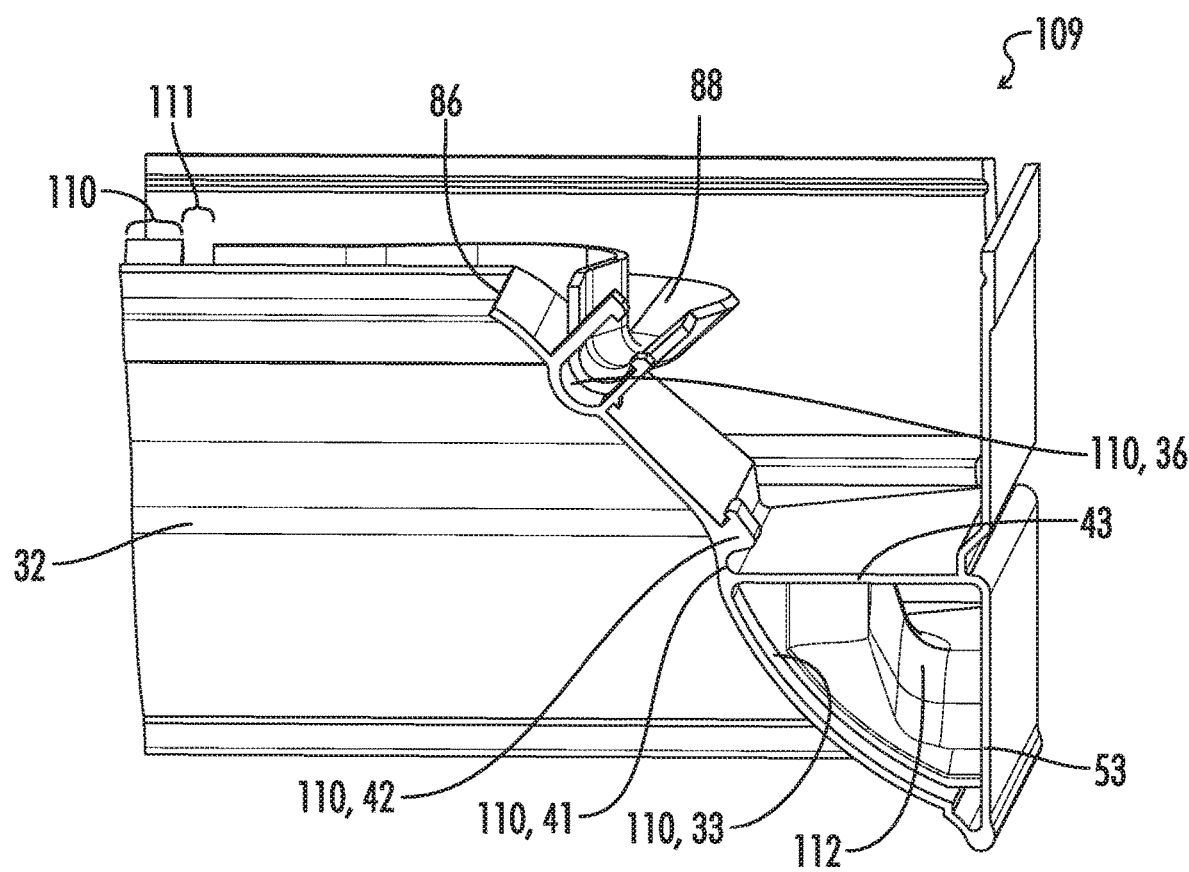
FIG. 19 is a perspective view of an inside corner piece which enables the joining of two straight sections of crown molding of this alternative embodiment and the safe communication of the included cables from one straight section through the illustrated inside corner to the other by providing smooth curved cable paths of differing radii that inherently prevent damaging sharp bends with the lower cable compartment in this alternative embodiment remaining enclosed.
Figure 20:
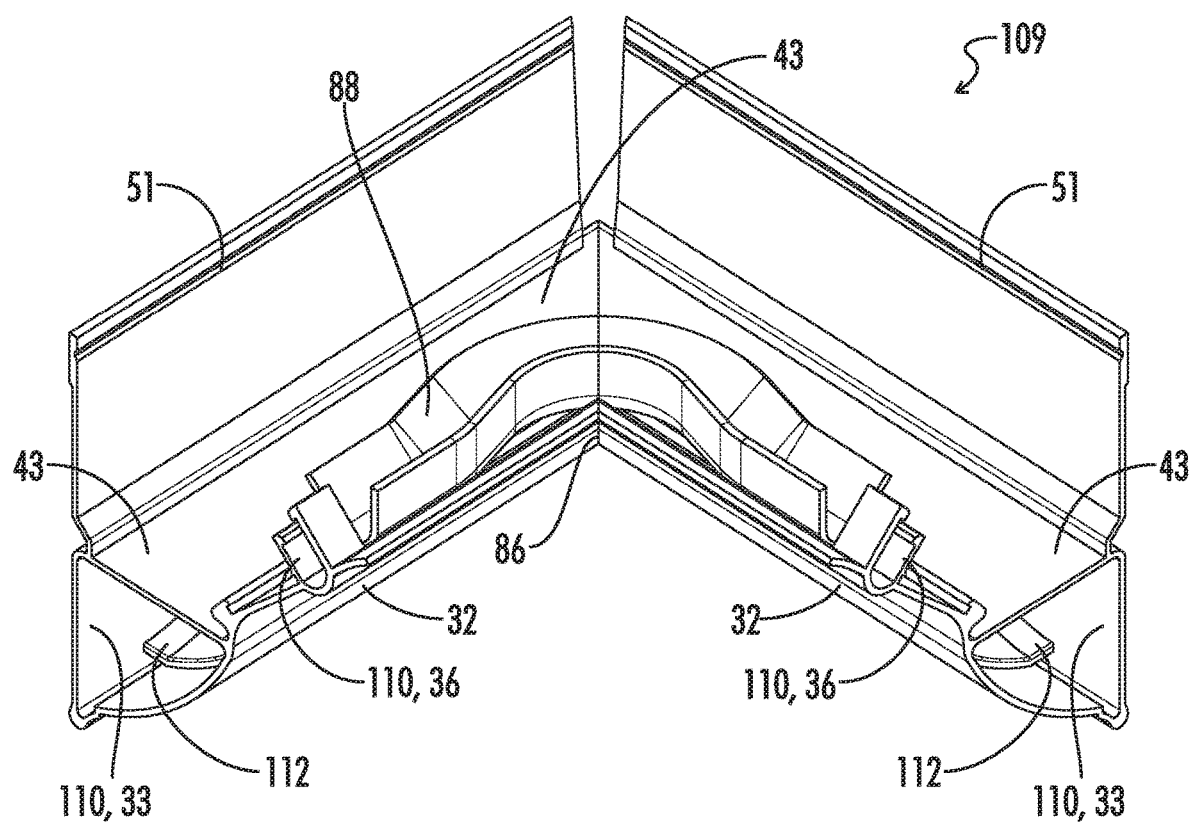
FIG. 20 is a perspective view from above of the inside corner piece shown in FIG. 20 illustrating the enclosed lower cable compartment throughout the inside corner section as well as the smaller radius copper communications cables cable path, also visible is the sharp corner where the decorative faces meet, which appears to the room as a traditional mitered crown molding intersection.
Figure 21:
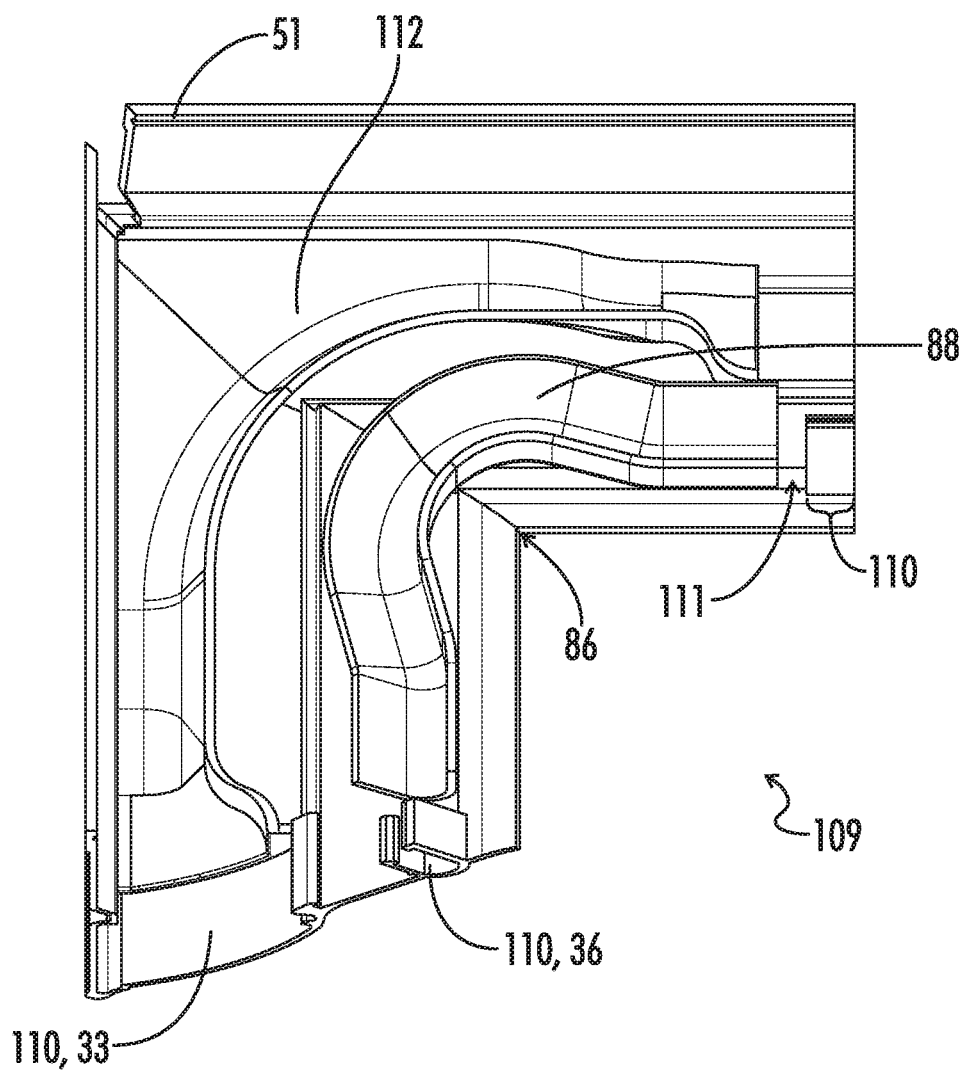
FIG. 21 is a top view of the inside corner piece with the otherwise present horizontal member rendered invisible to enable a view of the enclosed moderate radius cable path.

Now referring in particular to FIGS. 19-21 of the second preferred embodiment of the present invention, in which inside corner 109 is illustrated. FIG. 19 provides a perspective view from the side of inside corner 109. FIG. 20 provides a perspective view of inside corner 109 from above. FIG. 21 provides an additional perspective view of crown molding 109 from above within which horizontal member 43 is rendered invisible in order to provide a more complete view of cable path 112 which is otherwise obscured by horizontal member 43. The view of cable path 112 illustrated in FIG. 21 is for descriptive purposes only, as the structure of inside corner 109 will always include a horizontal member 43. The structure of inside corner 109 is a similar composite of fiber reinforced polymer (FRP) to crown molding 96 or may be formed of a suitable other plastic polymer of similar properties, however because of the non-linear nature of inside corner 109, a molding process known in the art to manufacturers of FRP products and other plastics may be used to mold inside corner 109 in several parts which are later assembled to form inside corner 109. Alternatively, inside corner 109 could be manufactured using iterative or 3d printing processes, which are capable of printing complex parts such as inside corner 109 without requiring assembly. Whichever method of manufacture is chosen, the current state of the art of manufacturing can be employed to manufacture inside corner 109. The properties of inside corner 109 as a crown molding system are described in the inventor's U.S. patent application Ser. No. 15/011,474, and are applied in the same way to the structure of inside corner 109. The structure as it relates to the second preferred embodiment of this invention is described here. There are three structural profile sections which comprise the structure of inside corner 109 as it relates to the second preferred embodiment of the present invention. Profile section 110 is a section of short length which starts at each end of inside corner 109, and travels a short distance along inside corner 109 terminating at the beginning of a short transition section 111. Profile section 110 has features which are exactly similar and matching to crown molding 96, both inside crown molding 96 and along decorative face 32. Profile section 110 matches exactly the structure in profile of crown molding 96 to facilitate joining sections of crown molding 96 to each end of inside corner 109. Transition section 111 travels a short distance starting at the termination of profile section 110 and terminating where each transition section meets the singular third profile section which is hereafter referred to as the curved path section, which comprises the remainder of the molding section between both transition sections 111. Crown molding 96 contains internal structures in addition to lower compartment 33 and upper compartment 36. The only structural pieces that relate to this second preferred embodiment of the present invention and remain within the curved path section of inside corner 109 and serve to the purpose of the present invention are cable paths 112 and 88. Cable path 112 starts at the termination of profile section 110 and proceeds through short transition section 110 and continues through the curved path section which is of moderate radius of approximately 1.5 inches, entering the other short transition section 111 travelling through and terminating at the other profile section 110 while horizontal member 43 remains as illustrated in FIGS. 19 and 20 and whose structure is uninterrupted providing for a completely enclosed lower compartment throughout inside corner 109. The structure of cable path 112 is such that there are no corners or structural obstructions within cable path 112, and no bends sharper than a moderately sized minimum radius of approximately 1.5 inches. As described in the inventor's U.S. patent application Ser. No. 15/011,474a connector insert is inserted a short distance into lower compartment 36 of a crown molding 96 section, that is to be joined to one of the inside corner profile sections 110, which remaining portion of the connector insert is inserted into profile section 110 of the inside corner, thereby ensuring alignment of the lower portion of decorative faces 32 where they abut. The beginning portion of cable path 112, from its start where profile section 110 meets short transition section 111, starts to separate from the interior side of decorative face 32 curving smoothly away from the interior side of decorative face 32 both as the upper edge of cable path 112 climbs a small amount closer to horizontal surface 43 within the interior of inside corner 109 until it smoothly transitions into the curved path section providing a moderate radius cable path 112. The structural height of cable path 112 continues to rise a small amount until it peaks in the corner of inside corner 109. This smoothly raised cable path 112 is thereby enabled to provide a smoothly curving cable path starting from lower compartment 33 within an abutting crown molding 96, through a short transition zone and into a somewhat elevated smooth curve of moderate radius that is completely enclosed within lower compartment 33 by horizontal member 43, lower compartment rear wall 48 and the lower portion of decorative face 32 and cable path 112 within inside corner 109 such that the entirety of the cable path from lower compartment 33 of one straight section of crown molding 96 through inside corner 109 and then into lower compartment 33 of a second attached straight section of crown molding 96 is completely enclosed, and without obstruction while bending with a radius no smaller than a moderate radius of approximately 1.5 inches. Cable path 88 has no structure within short transition section 89 and begins abruptly at the end of transition section 89 and provides a smooth cable path whose bends are no sharper than a small radius of approximately one inch. When viewed in profile, curved path 88 starts at its upper edge and travels towards the interior side of decorative face 32 and curves smoothly at the interior side of decorative face 32 and proceeds away from the interior side of decorative face 32 where it terminates at its lower edge. Decorative faces 32 of inside corner 109 meet in what appears to be a perfectly mitered junction of two straight sections of crown molding 96 when viewed from the room, although they are contiguous as one part of the molded, 3d printed or otherwise manufactured inside corner 109.

Referring now to FIGS. 22-26 in which a third embodiment of the crown molding assembly of the present invention is shown, crown molding assembly 113 is comprised generally of a standard crown molding section 114, a molding installation block 117, and a hardware socket forming structure 123. Standard crown molding 114 has a decorative face 32, a rear surface 115, and a wall contact surface 116 which is angled downwardly from the lower end of rear surface 115. Standard crown molding 114 can be any profile of crown molding as long as the spring angle is that which the system is designed for, and the profile is above a minimum profile height. Molding installation block 117 includes a molding attachment surface 118 against which the rear surface 115 of molding section 114 is secured, a wall contacting surface 119, a bulkhead 50 having a surface angled favorably to accept a screw and provide favorable access for a screw driving tool, and a horizontal surface 120 extending between bulkhead 50 and the upper end of the molding attachment surface 118. A plurality of installation screws 121 are provided to securely fasten molding installation block 117 to the wall onto which the crown molding assembly is to be installed, while fasteners such as finishing nails 122 are used to secure the crown molding 114 to the molding installation block with the rear surface 115 of molding 114 against molding attachment surface 118.

Structure 123 is also secured to the rear surface of molding section 115 above and slightly spaced apart from molding installation block 117. More particularly, rear surface 124 of structure 123 is adhered, nailed, stapled, or otherwise secured to rear surface 115 of molding 114 such that lower surface 125 is precisely positioned at a set distance away from horizontal surface 120 of molding installation block 117 as well as from wall contact surface 116 of molding 114. As a result, a hardware socket 126 having a set spacing between lower surface 125 of structure 123 and horizontal surface 120 of molding installation block 117 within crown molding assembly 113 is provided. As explained in greater detail below, the described structure provides a system and method for securing and installing hardware within crown molding assembly 113 anywhere along the length of the molding assembly subsequent to being installed.

Figure 22:
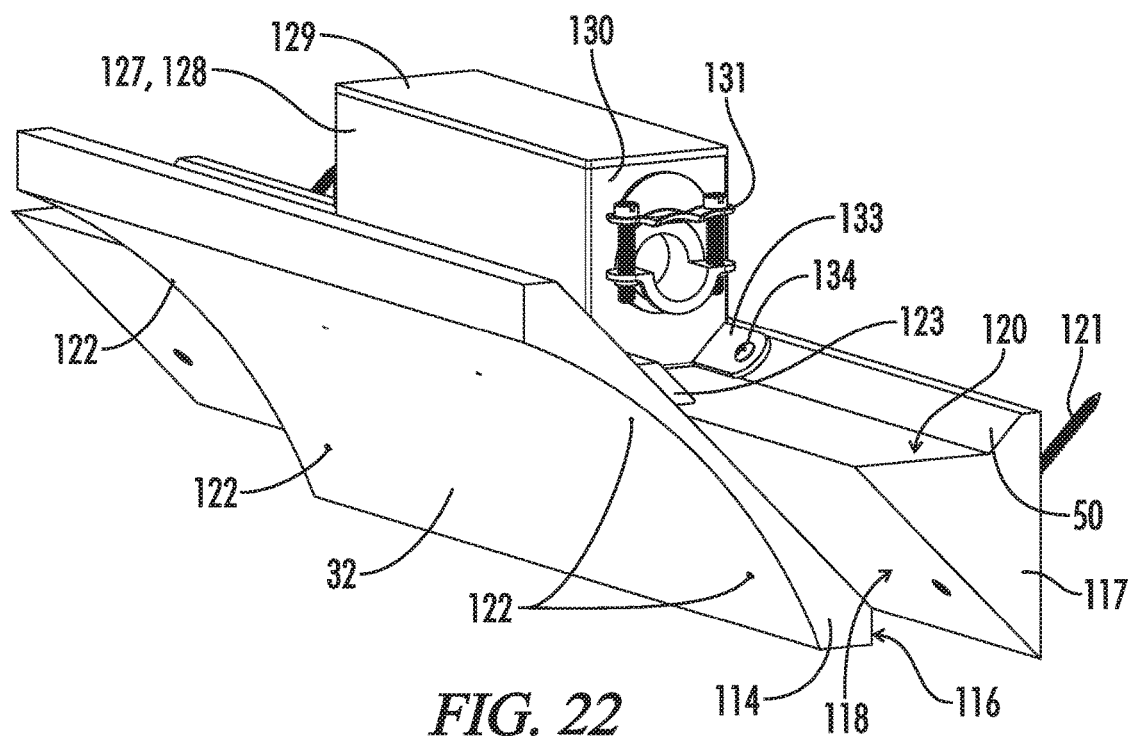
FIG. 22 is a perspective view of another alternative embodiment of the present invention illustrating an assembly of three components, a molding installation block, a standard crown molding of a matching spring angle to the molding installation block, and a third structure that when affixed to the crown molding and the crown molding is affixed to the molding installation block, forms a hardware socket behind the decorative face of the molding into which a corresponding hardware pivot on a piece of hardware to be installed such as the illustrated electrical box can be inserted and which is then secured by the favorably angled screws at the rear of the molding installation block.

Also shown is an electrical container 127 having a lower portion 128, and a lid portion 129 which is detachably securable to lower portion 128. Lower portion 128 includes a plurality of side walls 130, which side walls may include one or more prefabricated cutouts of various standard sizes to facilitate the use of standard electrical components. As shown in FIG. 22, a cable connector 131 is also provided on one of the side walls 130 to enable safe connection and entry of non-metallic sheathed electrical cable into electrical container 127. Lower portion 128 of electrical container 127 also includes a hardware installation pivot or tab 132 extending outwardly from the lower edge of the side wall 130 which is facing toward molding 114, which pivot 132 is sized to be snugly inserted into hardware socket 126 of molding assembly 113 in a manner explained in detail below. In addition, a surface of lower portion 128 of container 127 opposite pivot 132 is angled to facilitate being secured against the angled section of bulkhead 50, and container installation structures 133 are provided on opposite sides of the container for securing lower portion 128 of container 127 to bulkhead 50 using hardware fasteners 134 after installation pivot 132 has been inserted in hardware socket 126. An external power cord connector 135 is also secured to one of the side walls 130 of lower container portion 128 using fasteners 136.

Figure 23:
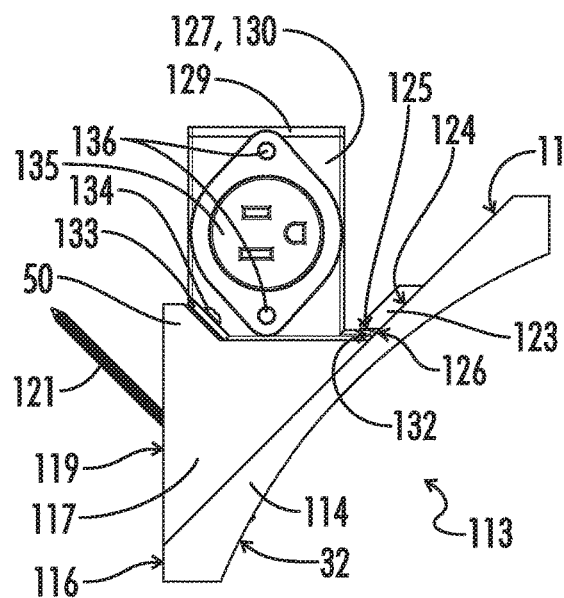
FIG. 23 is a profile view of the alternative embodiment of the present invention shown in FIG. 22 which details the hardware socket behind the decorative face of the crown molding and its interaction with the hardware pivot of the installed electrical box which secures the installed hardware using the favorably angled screws at the rear of the molding, also illustrated is the screw which affixes the molding installation block to the wall, prior to installation of the standard crown molding to the molding installation block.
Figure 24:
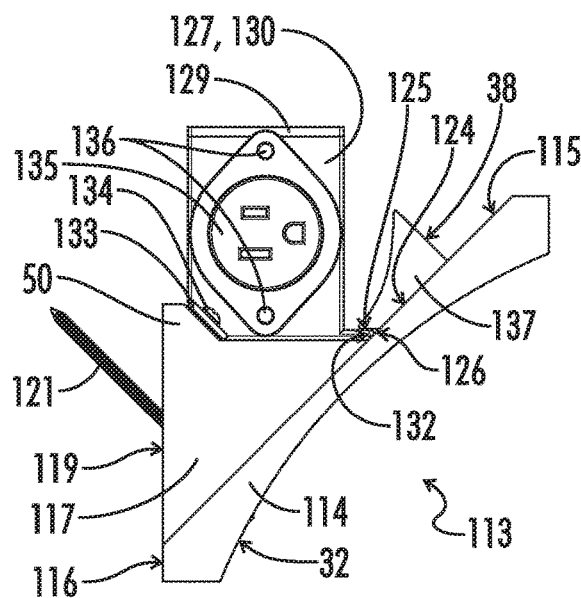
FIG. 24 is a profile view of an additional alternative embodiment of the present invention in which the third structure which forms the top of the hardware socket behind the decorative face of the standard crown molding to which it is affixed is adapted to include a location for installation of an LED light strip.

As illustrated in FIG. 24, the hardware socket forming structure 123 illustrated in FIGS. 22-23 has been modified to also serve as an LED light holding structure 137. Modified structure 137 may be secured to the rear surface 115 of crown molding 114 in the same manner as structure 123, but in addition including LED light strip location 38 on which an LED light may be secured as described in an earlier embodiment.

Figure 25:
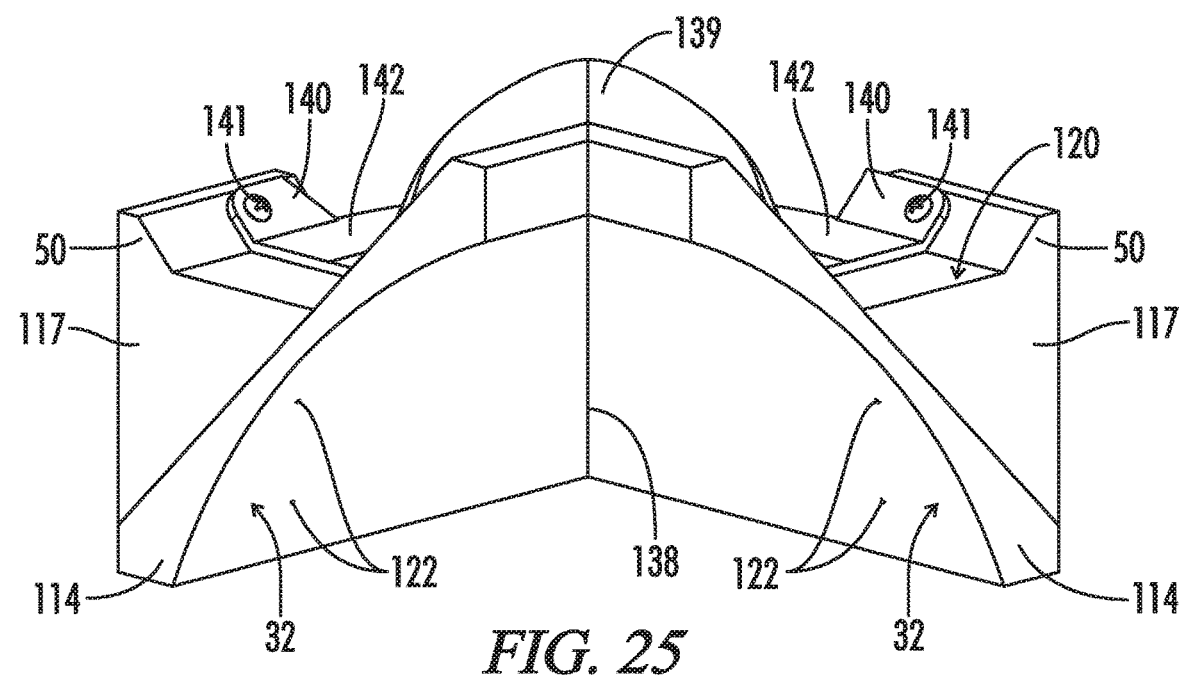
FIG. 25 is a perspective view of the alternative embodiment of the present invention shown in FIGS. 22-23 showing the junction of two straight sections of the molding assembly of this embodiment forming an inside corner with a separate insert providing a singular curved cable path around the corner that inherently prevents bends sharper than a set radius, also illustrated is the mitered junction of standard crown molding, and the termination of the molding installation blocks to allow the standard crown molding to terminate in a standard mitered joint at the corner, and where the molding installation blocks travel far enough to enable the curved cable path insert to be fastened with screws in the favorably angled screw location at the rear of the molding installation blocks.
Figure 26:
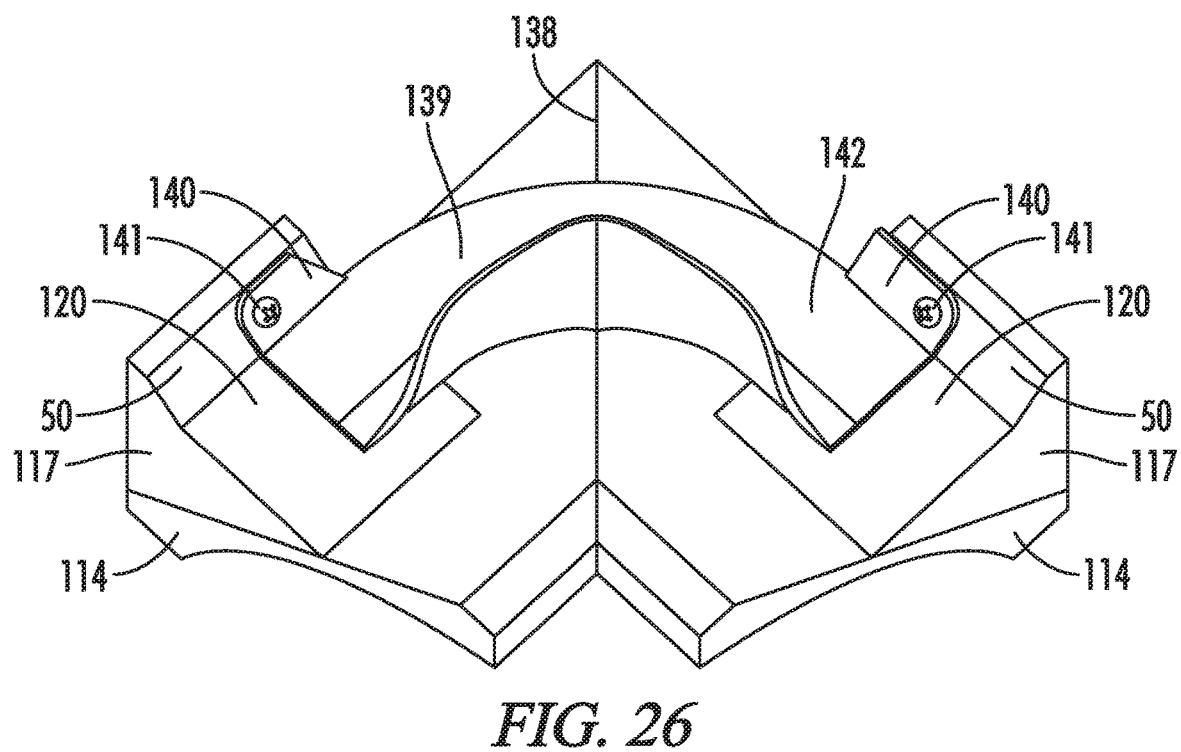
FIG. 26 is a perspective view from above of the junction of two straight sections shown in FIG. 25 illustrating the curved cable path insert and its installation relative to the termination of the molding installation blocks and the standard mitered intersection of standard crown molding.

FIGS. 25 and 26 illustrate the intersection of two crown molding assemblies 113 as would occur at an inside corner where two walls meet. Each assembly as it approaches the corner consists of one crown molding 114 connected to a respective molding installation block as described above, where each molding block 117 is attached to the wall as described above and terminates some short distance before the top-most portions of crown moldings 114 meet at the top most portion of mitered joint 138. Mitered joint 138 is a standard junction of crown molding sections 114, and where moldings 114 are cut and joined as is common in the current state of the art for crown molding installation involving mitered joints at inside corners. Curved path insert 139 is a unitary rigid plastic molded piece formed as is illustrated in FIGS. 25 and 26. Curved path insert 139 includes an angled structure 140 for securing the insert to bulkhead 50 using fasteners 141, a horizontal portion 142 which as shown in FIGS. 25-26 is installed against the horizontal surface 120 of the molding installation block 117, and an upwardly extending curved section 143 which extends upwardly from horizontal portion 142 on the side of insert 139 opposite angled structures 140. Curved path insert 139, once installed as described above, provides a moderate diameter cable path that inherently prevents NM type cable from damaging bends.

Having described the structure of three preferred embodiments of the present invention the methods of use and benefits of those methods are now described.

The first step in the deployment of the first and second embodiments of the present invention is to install the crown molding and all molding components such as inside corners and outside corners as is described in the inventor's U.S. patent application Ser. No. 15/011,474, within which an enabling description is provided. Description of the application of the first and second embodiments of the present invention to the installed crown molding follows herein.

Several specific components of this system and invention have particular characteristics which benefit from the present invention, and will be described with those benefits here.

Referring now in particular to the challenge identified in the background to this invention, indoor mapping is an area of potential within buildings that has not yet been fully realized. Technology is readily available to accurately map interior spaces within buildings but, due to the inability to reliably use GPS location data, location services are not employed as easily as they are outside. A method of employing a system of interconnected location beacons which are installed securely in a manner that they cannot be easily moved, in a location from which they can readily broadcast location data to and from recipient persons, devices or equipment, and is easily installed with ready access to power and communications cabling is described here as it would be deployed within the first embodiment of the present invention. A separate discussion of the deployment of a similar system within the second embodiment of the present invention will follow. Location beacon 75, as it would appear when installed in crown molding 30, is illustrated in FIGS. 8-10 within the first embodiment of the present invention, and those Figures are referenced in the description of this system. A location beacon 75 serves as a single node of an interconnected system of similar location beacons 75, wherein each is deployed as illustrated in FIGS. 8-10 around an interior space within crown molding 30. The location beacons 75 are connected to a wider network by communications cables either within crown molding 30 or via cable through and into the wall, and location beacons 75 additionally establish two-way communications via broadcast with persons, devices or other equipment, including other location beacons 75, within the space. The two-way broadcast communications with persons, devices and equipment within the space enables the provision of location services by establishing the precise position of a person, device or equipment relative to multiple location beacons 75 within the space, whose locations are mechanically secure within crown molding 30 and precisely defined. Two-way broadcast communications between location beacons 75 is also designed to detect any movement of any one location beacon 75 relative to the others, in which case an alarm is generated and the system can be assessed for accuracy and corrected accordingly, thereby protecting the accuracy and integrity of the system.

As previously described, crown molding 30 is formed from fiber reinforced polymer (FRP) using the continuous process of pultrusion. FRP has favorably properties toward the deployment of an interconnected system of location beacons 75, notably that the FRP material is radio transparent, and freely passes radio signals to and from location beacons 75 from antenna 82 behind decorative face 32, allowing location beacons 75 to operate while remaining concealed behind decorative face 32. The elevated position of crown molding 30 on the wall combined with the positioning and design of antenna 82 are favorable to broadcasting and receiving signals from persons, devices and other enabled hardware within and travelling through the space, in addition to sending and receiving signals from other nearby location beacons 75. The installation process for a location beacon 75 is as follows. First, the installer identifies a location within a straight section of crown molding 30 where no other equipment, connecters for abutting sections 30, or other obstructions impede installation. In particular, rear wall 53, bulkhead 50, the upper surface of both horizontal members 43 and curved hardware pivot 41 should be clear of obstruction. Second, a hole is drilled through upper portion 53 of the rear section of crown molding 30, positioning the hole to ensure alignment with a hole that is formed into vertical member 81 of hardware platform 76. The hole through upper portion 53 must be drilled at an angle using an appropriate drill guide for drill placement. The drill bit must be appropriate for drilling through FRP, such as an abrasive bit. After drilling the hole through upper portion 53, long portion 71 of long cylinder 70 is inserted into the hole and protruding through upper portion 53 of crown molding 30 and through the wall onto which crown molding 30 is installed, until locating washer 73 is against the interior surface of upper portion 53 of the rear section of crown molding 30. Location beacon 75 can then then be placed within crown molding 30 by first placing hardware pivot 80 firmly within curved hardware socket 41, with the rear of hardware platform 76 toward bulkhead mating portion 77 elevated somewhat off of rear-most horizontal surface 43. FIG. 18 of the second embodiment illustrates a different piece of hardware, shown in a position and at an attitude similar to that of location beacon 75 at this point of installation. Hardware platform 76 and, accordingly, location beacon 75 can now be rotated into place with hardware pivot 80 of hardware platform 76 firmly seated against curved hardware socket 41. After rotation hardware platform 76 will be firmly mated against the entirety of each horizontal member 43, bulkhead 50 and upper portion 53 of the rear section of crown molding 30. Short portion 72 of long cylinder 70 is temporarily deformed as hardware platform 76 is rocked into place, but returns to form after upper member 81 of hardware platform 76 is in place with short portion 72 protruding through the hole in vertical member 81 and into the interior of crown molding 30, providing a protected cable path 74 from the interior of crown molding 30 to the interior space of the wall. Alignment ridges 45 and corresponding alignment channels 79 within hardware platform 76 are critical to installing hardware platform 76 and, as in this example, location beacon 75. If gap 44 is too narrow during installation, then, as rear member 81 and bulkhead mating portion 77 of hardware platform 76 are rotated into place while hardware pivot 80 is seated within curved hardware socket 41, curved hardware socket 41 will be forced outward as the rear of hardware platform 76 prematurely contacts upper portion 53, forcing the expansion of gap 44 until hardware platform 76 seats fully against horizontal members 43, with gap 44 forced to its designed width. Alignment channels 79 provide fine-grained adjustment of gap 44 as the angled sides of alignment channels 79 slide against the angled sides of alignment ridges 45 until seating at the precise width for which gap 44 was designed. Two screws 78 through bulkhead mating portion 77 and bulkhead 50 lock in gap 44 and interlocking alignment ridges 45 and alignment channels 79 maintain it thereafter. If gap 44 is just slightly wider than designed, then front-most alignment channel 79 will be able to engage front-most alignment ridge 45 after which point the angled sides of both alignment channels 79 will force a narrowing of gap 44 as the angled sides of alignment channels 79 slide down the angled sides of alignment ridges 45 until hardware platform 76 seats fully against horizontal members 43, with gap 44 aligned precisely to its designed width. If gap 44 is more than slightly wider than it was designed to be, then the bottom horizontal surface of hardware platform 76 between hardware pivot 80 and front-most alignment channel 79 will strike the top surface of front-most alignment ridge 45, preventing hardware platform 76 from seating until gap 44 is reduced sufficiently for alignment channels 79 to engage alignment ridges 45 thereby securing a precise gap 44 and a mechanically secure location for hardware platform 76 and location beacon 75.

Previous to describing the installation process for a location beacon 75 a system of multiple location beacons 75 was described in which accuracy and the mechanical security of location beacons 75 is critical to operation. One of the benefits of the first embodiment of the present invention is the ability to easily install hardware such as a location beacon 75, and to install it in a manner that is concealed, able to broadcast its location data, precisely located and mechanically secured in a simple manner requiring inserting two screws into a position favorable to tool access and one hole drilled through the back of the molding and into the wall. Additionally, the installation of additional hardware such as location beacon 75, or any additional hardware that meets the form factor requirements immediately below, can be easily installed without penetrating or damaging decorative face 32 of crown molding 30 and also without penetrating or otherwise violating either lower compartment 33 of upper compartment 36.

The installation procedure for location beacon 75 can be applied to any desired hardware that can be packaged within a form factor that can fit or otherwise be incorporated onto a length of hardware platform 76 provided there is enough clearance between the structures on the interior side of decorative face 32 and the desired hardware such that the entire assembly can be rocked sufficiently to allow hardware pivot 80 at the front-most edge of hardware platform 76 to pass by the inner-most portion of hardware socket reinforcing structure 42 as the assembly is lowered into the interior of crown molding 30 for installation. This allows for a vast array of useful hardware to be installed easily and securely within crown molding 30 after the crown molding has itself been installed high on the wall, and where that hardware has direct access to power cables within lower compartment 33 and communications cables within upper compartment 36. As shown in the example of location beacon 75 cables can also be safely transported to or from the hardware and into the wall through protected cable path 74 of a long cylinder 70 installed as described above. Because crown molding 30 is installed at least some distance below a ceiling, cables entering or leaving the wall through protected path 74 of a long cylinder 70 can access any desired device installed on or within the wall to which crown molding 30 is mounted.

The installation of location beacon 75 within embodiment 2 of the present invention, whose straight section 96 is illustrated in FIGS. 14, 15, 17 and 18, is similar to the method described above for installation of location beacon 75 within straight crown molding section 30 of embodiment 1 as described above. The structure of crown molding 96 differs from that of crown molding 30 in that horizontal member 43 is singular and continuous in crown molding 96 and, accordingly, alignment ridges 45 in crown molding 30 are unnecessary and are eliminated from the structure of singular horizontal member 43 throughout the second embodiment of the present invention. The structure of crown molding 96 and crown molding 30 are otherwise identical. Alignment channels 79 within hardware platform 76 of location beacon 75 as illustrated in FIGS. 8-10 are also unnecessary for installation within crown molding 96, however they do not need to be eliminated for effective and secure installation within crown molding 96.

The installation process for a location beacon 75 within crown molding 96 of the second preferred embodiment of the present invention is as follows. First, the installer identifies a location within a straight section of crown molding 96 where no other equipment, connecters for abutting sections 96, or other obstructions impede installation. In particular, upper portion 53 of the rear section of crown molding 96, bulkhead 50, the upper surface singular horizontal member 43 and curved hardware pivot 41 should be free of obstruction. Second, a hole is drilled through upper portion 53 of the rear section of crown molding 96, positioning the hole to ensure alignment with a hole that is formed into vertical member 81 of hardware platform 76. The hole through upper portion 53 must be drilled at an angle using an appropriate drill guide for drill placement. The drill bit must be appropriate for drilling through FRP, such as an abrasive bit. After drilling the hole through upper portion 53, long portion 71 of long cylinder 70 is inserted into the hole and protruding through upper portion 53 of crown molding 30 and through the wall onto which crown molding 96 is installed, until locating washer 73 is against the interior surface of upper portion 53 of the rear section of crown molding 96. Location beacon 75 can then then be placed within crown molding 30 by first placing hardware pivot 80 firmly within curved hardware socket 41, with the rear of hardware platform 76 toward bulkhead mating portion 77 elevated somewhat off of the portion of singular horizontal surface 43 closest to bulkhead 50 of crown molding 96. FIG. 18 of the second embodiment illustrates a different piece of hardware, shown in a position and at an attitude similar to that of location beacon 75 at this point of installation. Hardware platform 76 and, accordingly, location beacon 75 can now be rotated into place with hardware pivot 80 of hardware platform 76 firmly seated against curved hardware socket 41. After rotation hardware platform 76 will be firmly mated against the entirety of singular horizontal member 43, except where for alignment channels 79 if they remain within hardware platform 76, bulkhead 50 and upper portion 53 of the rear section of crown molding 96. Short portion 72 of long cylinder 70 is temporarily deformed as hardware platform 76 is rocked into place, but returns to form after upper member 81 of hardware platform 76 is in place with short portion 72 protruding through the hole in vertical member 81 and into the interior of crown molding 96, providing a protected cable path 74 from the interior of crown molding 96 to the interior space of the wall onto which crown molding 96 is installed.

An additional benefit of the present invention is the ability to install power cables and communications cables within an assembled and installed system of crown molding 30 and any additional installed components of the system of the first preferred embodiment of the present invention including inside corner 84 and outside corners which are made by applying the same principles towards the same ends as described for inside corner 84. An assembly of installed crown molding sections including those described in the first embodiment of the present invention and others, such as outside corners built under the same principles described, are assumed to be installed around the entire perimeter of an interior space at a height equal across all walls within the space which is substantially high on the wall and consistent with crown molding installation, yet is also some distance below the ceiling to provide access within the crown molding and to allow adequate room for an light from lighting location 38 to indirectly light the space using the ceiling. Light reflector assembly is not included in this example installation of a system of installed sections of the first embodiment of the present invention.

Power cables are installed within the installed system of crown molding described in the first embodiment as follows, preceded by a description of the benefits of the first embodiment of the present invention as it relates to cable protection for the installed power cables. In this example, MC-type metal armored power cables are selected for power cable installation. This selection is not meant to be limiting for this embodiment or the invention as a whole, but rather illustrative of one possible selection. Under NFPA 70: National Electrical Code, MC cable must be protected from physical damage. As it relates to the first embodiment of the current invention, MC cable is afforded protections against harms due to cable bends that are sharper than the minimum allowable bend radius as well as protection from inappropriate penetrations when installed behind decorative face 32 within any installed components of the present invention. The NEC specifies the minimum bend radius for MC cable as 7 times the outside diameter of the cable. In this example 12-2 (two 12 gauge individual conductors for power with a separate 12 gauge equipment grounding conductor) MC cable will be used to distribute one or more standard 110 volts AC branch circuits for lighting at 20 amps. A popular brand of 12-2 MC cable has an outside diameter of 0.475 inches, resulting in a minimum bend radius of 7*0.475 inches or 3.33 inches. Cable path 87 is built within inside corner 84 as illustrated within FIGS. 11-13, and in a corresponding outside corner, and curves along its inside edge at a radius of approximately 4 inches, which is well larger than the specified minimum for this example using 12-2 MC cable. This uniquely protects installed 12-2 MC cable from being pulled against the otherwise sharp corner in either an inside corner (against the sharp corner of the rear of the intersecting decorative faces of the crown molding) or an outside corner (against the sharp corner where the walls meet). This pulling of the cable causing an unsafe sharp bend can occur during installation or anytime thereafter absent a large diameter curved path 87, especially when the cables or equipment connected to the power cables are being installed, removed or serviced. Cable path 87 protects the installed cables from unsafe bends by providing a path that inherently prevents them from bending sharply, whether by pulling the cables at installation or any subsequent actions which result in pulling. It is noted here that the description within the first embodiment of a curved path 87 with a radius of approximately 4 inches is by way of example only, and not intended to be in any way limiting. If a cable with a minimum bend radius greater than four inches is to be employed within a system of crown molding as described within the first embodiment of the present invention, the entire system of crown molding could be enlarged such that the radius of curved path 87 if five inches, or any greater dimension as needed.

The crown molding system described in the first embodiment of the present invention also protects the example 12-2 MC power cables from penetrating damage in the following ways. First, the installation of the molding system itself to the walls of the interior space within which it is installed, in addition to the installation of any hardware such as location beacon 75, is designed such that a piercing fastener such as a nail or a screw never penetrates decorative face 32 of the molding system, and is never directed toward lower compartment 33 or curved path 87, within which the 12-2 MC power cables will be installed. Second, throughout decorative face 32 from top to bottom as viewed in profile, and along the entirety of its length across all installed molding section types, is a purposeful increased directionality of reinforcing fibers 90, as illustrated in FIG. 11 of the first preferred embodiment. The base crown molding of this invention, as described in the inventor's U.S. patent application Ser. No. 15/011,474, will likely include a decorative face reinforced with a bi-directional mat whose fibers extend orthogonally to each other in two directions. This application of a bidirectional mat of reinforcing fibers within the decorative face provides for a decorative face that is preferentially stiffer than the attachment portion of the crown molding of the previous invention. Increased directionality of reinforcing fibers 90 refers to a purposeful increase in the reinforcing fibers, over and above that required to implement the characteristics of the previous invention, with the specific purpose of causing a fracture of decorative face 32 if it is penetrated by a nail, screw or any other penetration that attempts to expand the FRP material that comprises decorative face 32. Although increased directionality of reinforcing fibers 90 is one method of designing decorative face 32 to fracture upon penetration which requires expansion of the FRP material, any other materials engineering design practices such as polymer selection, polymer mixing, different cure times or temperatures may be employed to support the implementation of the present invention whereby it protects cables behind decorative face 32 by being designed to fracture upon penetration requiring expansion.

Having described the benefits of this invention to protecting cables from unsafe bends and protecting cables behind decorative face 32 from penetrative injury, installation can now be addressed. Power cables 34, 12-2 MC cables in this example, will exit the electrical panel inside the wall underneath one section of the installed crown molding system of the first preferred embodiment of the current invention. The MC cables can be fished up the wall to one or more holes drilled in the upper portion 53 of crown molding straight section 30. This hole will be purposefully drilled larger than the diameter of the MC cable to be pulled through and into the interior of crown molding for two purposes, first to allow the pulling mechanism such as a fishing wire commonly used to pull electrical wire through the hole along with the MC cable and, second, to allow the MC cable to move and change its attitude as it emerges into the crown molding thereby preventing damaging sharp bends as it is routed into lower compartment 33. The MC cable is placed through gap 44, which affords easy access to lower compartment 33 for the 12-2 MC cables of this example, of which two are installed into lower compartment 33. The MC cables can then be pulled or placed further along lower compartment 33 passing under many installed horizontal reinforcing members 49 which are installed at each framing member within the wall, and also under each piece of installed hardware such as location beacons 75 until the MC container reaches a piece of installed equipment within the molding to which the cable is to be connected to provide power, such as to an LED light controller and driver, such as would commonly be employed to power an LED light strip 39 installed onto light location 38. It is noted here that the cable can be pulled under all installed structures and through all installed curved cable paths 87, up to the maximum number or amount of bends allowed by the electrical code, and can be done without that pulling causing any unsafe bends. Further, all structures installed on horizontal surfaces 43 within a crown molding straight section 30 serve to keep power cables 34 within lower compartment 33 as they are pulled, and curved paths 87 having an upper portion that curves in profile to keep power cables 34 within curved paths 87, such that pulling the cables is easily accomplished while keeping power cables 34 properly placed. Gap 44 also serves to make multiple pulls for one long run of cable that travels through too many bends for one pull easy in that, at the point between multiple pulls, power cables 34 are simply pulled along so that at the midpoint of the pull they exit lower compartment 33 through gap 44. There, power cables 44 are pulled out of the molding after being pulled through an acceptable number of bends, while power cables 34 prior to exiting are held within lower compartment 34 by the closest horizontal reinforcing structure 49, so that the entire pull from its start to that closest structure 49 to the pull exit point is kept within compartment 33 by many horizontal reinforcing structures 49 at each framing member within the wall, any additional hardware installed on horizontal surfaces 43 between structures 49, and by the upper portion of curved paths 87. The pull can be completed by repeating the same process as many times as needed to get the cables to their intended destinations.

Gap 44 between horizontal members 43 within crown molding straight sections 30 also allows for the example MC cables to enter equipment installed on horizontal surfaces 43. The example cited above, of an LED light controller and driver for LED light strip 39, is connected to a power cable within lower compartment 34 as follows. First, the LED controller and driver is packaged into a container similar to electrical container 102 as illustrated in FIGS. 17 and 18 of the second preferred embodiment of the present invention. Electrical container 102 will be adapted to be installed within a straight section of crown molding 30 as in this example by the exclusion of any holes through bottom wall 107 and the inclusion of two alignment channels within the bottom surface of bottom wall 107, such that they can interface with alignment ridges 45 as described for hardware platform 76. All electronics associated with controlling and driving LED light strip 39 are contained in the center portion of the adapted electrical container 102, which may be of increased length measured as the distance between side walls 104 as needed. On either side of the LED driver and control electronics portion, and within electrical container 102 is an open space sufficient for the individual conductors within MC power cable 34 to emerge from the metal armor of MC cable 34, and be securely connected to terminals within the space for each of the conductors. These terminals for the individual conductors of power cable 34 are included on each side of the LED driver and controller electronics, and the LED driver and controller electronics are electrically connected to one set of terminals from which it draws the power to operate and to light LED light strip 39 as desired. Additionally the terminals on each side of electrical container 102 are connected to each by other by insulated conductors which travel safely past the centrally located LED driver and control portion, thereby connecting the power cable 34 entering electrical container 102 through one side wall 104 to the power cable 34 exiting electrical container 102 through the opposite side wall 104, whose individual conductors are also connected to the terminals within its empty space portion of electrical container 102. This results in passing all of the electrical power carried by entering power cable 34, minus the electricity used by the connected LED driver and controller, through electrical container 102 with exiting power cable now able to transmit the remaining power to other similarly installed and connected devices. The final additional components are standard MC cable connectors, one each of which are installed on each side wall of container 202, and accepts one MC power cable 34 which enters the connector oriented perpendicularly to side wall 104, wherein its metal armor is terminated and tension relief provided and the individual conductors are passed through safely to the respective empty space within electrical container 102. This orientation of MC power cables 34 at their respective terminations perpendicular to side walls 104 allows for power cables 34 to rise and fall naturally from lower compartment 34 to their respective connection points at hardware container 102 side walls 104.

There are simple improvements which can be made to a system of crown molding such as described in this first embodiment of the present invention which can render the lower compartment a wet location, suitable for containing electrical cables recognized and certified for use in a wet location. A wet location under the NEC is one which is expected get wet, such as outdoors and not under cover, yet has adequate drainage so that the cables location does not become submerged. This can be achieved in lower compartment 33 by drilling drainage holes at the bottom of lower compartment 33. This would occur at manufacturing, after the pultrusion process, as a secondary operation. A drill could be positioned on an assembly line so that as crown molding 30 passes by, that drill and appropriate abrasive drill bit could drill a hole periodically through the outer surface of the curve between bottom-most point 46 of crown molding 30 and lower rear contact surface 47 as viewed in FIG. 2. This hole would continue through and into lower compartment 33, providing drainage. These holes could be sized and spaced to provide suitable drainage of lower compartment 33. The surface between lowest point 46 and lower rear contact surface 47 is ideal for drainage holes as it is hidden in shadow and obscured from view, by design. With drainage holes in place MC cables rated for a wet location, MC cable connectors rated for a wet location, and standard gasket use at the joint of an electrical container and lid could all be combined to provide power distribution suitable for deployment outdoors. In addition, locating washer 73 of long cylinder 70 can be engineered using standard methods and practices known in the art to provide a watertight seal when it is compressed between rear wall 108 of an electrical container 102 and upper portion 53 of the rear section of crown molding 30, providing watertight cable entry to electrical container 102 for power cables 34 from the wall.

With protection, distribution and connection of power cables within an installed system of crown molding as described in the first embodiment of the present invention described, the protection, distribution and connection of communications cables within upper compartment 36 will now be described. This description will focus on copper conductor communications cables such as communications cables 37 within upper compartment 36. Communications cables 37 can enter a straight section of crown molding 30 by passing through a hole drilled through upper portion 53 of the rear section of crown molding 30. The communications cables in this example are Category 6 shielded non-metallic sheathed cable and, as such, will require abrasion protection to safely travel through the wall and upper portion 53 of the rear molding section of crown molding 30 and into the interior of crown molding 30. Long cylinder 70 can provide abrasion protection for safe entry of communications cables 37. FIG. 15 of the second embodiment of the present invention illustrates an assembly of crown molding 96, hardware platform 76 and long cylinder 70 used to provide a safe cable path for from the interior of crown molding 96 into the wall for camera communications and power cable 101. The same assembly of crown molding 30, hardware platform 76 and long cylinder 70, where platform 76 as shown in FIG. 15 is adapted with two alignment channels added within the underside of its horizontal member such that they correspond with alignment ridges 45 within crown molding 30 can provide safe passage of communications cables 37 from within the wall to the interior of crown molding 30. The communications cables 37 can then be routed to upper compartment 36, and distributed around the interior space. The NEC specifies a minimum bend radius for non-metallic sheathed low power communications cables of four times the outer diameter, which for typical Ethernet cables is approximately one inch. This minimum bend radius is considerably smaller than that for power cables 34, and cable path 87 is sized accordingly. This information allows for communications cables to be run within a completely separate cable path which will inherently limit bends to a radius that prevents unsafe bends, as well as being installed behind decorative face 32 which contains an increased directionality of reinforcing fibers designed to fracture decorative face 32 upon being pierced with any fastener that will require expansion of the FPR, as previously described, thus providing a cable location, path and protection that is easy to install, and accessible to a wide range of equipment which can be installed within crown molding 30.

Now turning to another implementation example of the first embodiment of the present invention, the deployment of a DC voltage grid newly deployed in an existing building along with an LED lighting system, all installed within a system of crown molding components described in this first embodiment of the present invention also utilizing light reflector assembly 31 to increase efficacy of the LED lighting system and to distribute the additional cable capacity necessary for the DC grid.

First, installation heights for the crown molding system and light reflector system are chosen so that the top edge of light reflector 55 is positioned a short distance below the ceiling and the crown molding system is positioned a short distance below the lower edge of light reflector, approximating the spacing illustrated in FIG. 1 of the first preferred embodiment of the present invention. The crown molding system including straight sections 30 and any inside or outside corners needed are installed on the wall, along with light reflector assembly 31 brackets 60. Cable tray 56 is then installed, using existing ventilated bottom cable tray that is supported by brackets 60 is installed selecting existing cable tray corners that themselves inherently protect power cables 59 within cable tray 56 from unsafe bends. Note here that the use of a cable tray 56, and the use of brackets 60 to support cable tray 56 is not meant to be limiting, but illustrative by way of example. Other cable tray structures are available which are supported by the wall directly and others which are hung from and supported by the ceiling. Either wall mounted cable tray or ceiling hung cable tray would remain substantially if not entirely concealed by light reflector 55 and, given the function of 55 as a light reflector, would be further obscured by shadow. Any safe mechanism of supporting extra cable capacity behind light reflector would fulfill this purpose of the first embodiment of the present invention.

After cable tray 56 has been installed, and the number of power distribution cables has been calculated, the power cables that will be run can be entered from the wall behind light reflector 55, using common methods in the electrical arts, and placed and run within cable tray 56 consistent with known methods and standards of cable tray wiring. Then crown molding 30 and any other inside and outside corners can be wired with its capacity of power cables 34, and as many communications cables 37 as upper compartment 36 can carry. If additional capacity for communications cables is needed, then a cable tray divider 57, known in the art, can be installed within cable tray 56 and additional communications cables 58 can be distributed within light reflector assembly 31. After assembly of all necessary cables, electrical components and hardware are complete within crown molding 30 and light reflector assembly 31, light reflector 55 can be fastened into place, concealing all of the additional capacity contained within brackets 60 and increasing the efficacy of crown molding 30 as a luminaire.

The advantages of deploying this invention with crown molding 30 and light reflector assembly 31 working together are an increase in efficacy of LED light strip 39, resulting in reduced energy needed to produce the same light level, and, separately, increased capacity for both power distribution, as would be needed for a DC power grid within a building that powers many other devices in addition to LED light strip 39, and additional communications cable capacity, as will be needed as the Internet of Things vastly increases the data produced by and communicated by non-computer devices including lighting systems. All of this is accomplished within an existing building where a suspended ceiling is not a desired option and is accomplished without opening up a trench along the interior walls to run cable, and maintaining easy access for maintenance, repair and upgrades for all system components.

The second embodiment of the present invention benefits from many of the same characteristics as the first, such as an upper compartment 36 for communications cables 37, and a similar curved path 88 in the corners for communications cables 37. The major difference is the singular, continuous horizontal member 43 and corresponding lack of alignment ridges 45. This leads to a closed cable compartment 33 for a different type of power cables. The first embodiment of the present invention routed metal armored power cables in its lower compartment 33 and, given the large minimum bend radius of metal armored cable, cable path 87 curves with a correspondingly large bend radius of approximately 4 inches. Lower compartment 33 of the second embodiment of the present invention will contain non-metallic sheathed power cables (NM cable), which have a reduced minimum bend radius as compared to the same capacity metal armored cables. The NEC requires a minimum bend radius of 5 times the diameter of NM cable, and using the same cable capacity as previous examples, a 12 gauge 12-2 NM cable with a diameter of approximately ⅜ inch has a minimum bend radius of 1.88 inches, or less than the approximately 2 inch bend radius of cable path 112 for the moderate diameter cable path for power cables within inside corner 109.

The method for introducing power cables into lower compartment 33 of crown molding 96 of the second embodiment is different, in that power cables enter directly into an electrical container 102 through a hole in upper portion 53 through protected path 74 of cylinder 70 as illustrated in FIG. 17. NM power cables can then either be spliced with a similar but separate power cable to be run within lower compartment 33, or fed through protected path 95 within short cylinder 91 whose locating washer 94 is partially compressed between horizontal member 43 and a slightly recessed area within the bottom surface of bottom wall 107 of electrical container 102, and into lower compartment 33. NM power cables can then be pulled using standard methods and practices around as many bends as allowed under the NEC and follow a path that through corners inherently prevents bends sharper than the minimum bend radius of the cable. Where nm power cables are needed to power hardware mounted on horizontal member 43, a similar method is used as described for exiting electrical container through a short cylinder 91 whose locating washer 94 is sandwiched between the upper surface of horizontal member 43 and the underside of an electrical container 102 which contains the electrical equipment for the power cable to electrify.

FIGS. 14 and 15 of the second embodiment of the present invention illustrate how camera 97, or other similar electrical equipment such as photo sensors or motion sensors, can be mounted within parallel planes portion 54 of decorative face 32 of crown molding 96. This is an advantageous placement of a camera or a photo sensor as it is separate from, and does not interfere with the two separate cable compartments 33 and 36, and it is low enough on decorative face 32 that it is shielded by the decorative face between the camera or sensor and upper edge 40 of decorative face 32 from the indirectly lit ceiling. This allows the camera to get a clear view of the space it is installed in without exposure to too much light from the ceiling. Similarly, for the photo sensor, which must measure the light level within the space, not at the lit ceiling, this favorable position enables more accurate readings.

Installing these sensors requires carefully marking and drilling a hole through decorative face that is entirely within parallel planes portion 54 of decorative face 32 using an abrasive drill bit that will not fracture decorative face 32. Camera 97 is then inserted through the hole in decorative face 32 until bezel 98 seats against the outward facing surface of decorative crown 32. Then installation nut 100 can be placed over the body of camera 97 and is threaded onto threaded portion 99 of camera 97 and then tightened against the flat and parallel interior surface of decorative face 32 until camera 97 is secured. Then power and communications cable 101, which delivers power and communication to camera 97 using a protocol such as Power over Ethernet, can be attached to camera 97 and safely enter the wall through protected path 74 of long cylinder 70 which is installed using methods previously described. It is noted here that the method for installation of a camera or sensor through parallel planes portion of decorative face 32 is exactly the same for a camera or sensor mounted in a crown molding 30 of the first preferred embodiment of the present invention.

Increased directionality of reinforcing fibers 90, as illustrated in FIG. 11 of the first embodiment of the present invention, will also be applied in a similar manner to all decorative faces 32 within the second preferred embodiment of the present invention, providing similar protection from penetrations as described above.

It is also noted that light reflector assembly 31 may be similarly employed with the second embodiment of the current invention, to increase the efficacy of crown molding 96 as a luminaire, and to conceal additional cable capacity for both power and network cables.

The third embodiment applies the principles of the present invention to a different base crown molding structure. As described above, the third embodiment of the present invention uses standard crown molding, and as long as the molding matches the spring angle for which the system was designed and is above a minimum length from top to bottom as viewed in profile, any molding with any pattern of decorative face may be used. In the example used to illustrate the third embodiment of the invention, the spring angle of the system is 45 degrees, and as long as the molding is long enough from top to bottom to obscure installed hardware such as electrical container 127 and curved path insert 139 from view to those in the room. This system will be provided as a kit with molding installation block 117 being sold alongside structure 123 or, alternately, light holding structure 137, as well as alongside curved path inserts 139 for both inside and outside corners. Electrical containers as well as LED light controllers adapted with a pivot 132 and hardware installation structures 133 could also be made available as parts of an economical and simple system to cove lighting within a home. If a system using structure 123 is chosen, then an electrical container 127 could be installed, benefitting from the fundamental principle of favorably angled screw locations enabling easy, secure installation of hardware within crown molding after it has been installed near the top of a wall by leveraging pivot 132 and socket 126 and resulting in easy installation of a secure electrical box within which a NM type electrical cable carrying household electricity can be safely routed into electrical container 127 and allow a home owner to plug in standard strings of ornamental LED lights and achieve a desirable, if not terribly efficacious, result. A system using LED light holding structure 137 provides an opportunity for a more sophisticated and efficacious LED light strip installation with a favorable light location, in which case an LED light controller adapted for used with the system could be installed with electrical supply cables being safely routed in a cable path that inherently prevents damaging bends.

Although members 43 in the first embodiment of the present invention, and member 43 in the second preferred embodiment of the present invention, and surface 120 in the third embodiment of the present are all previously described as horizontal, it will be understood that any members 43, member 43, or surface 120 that are other than horizontal yet serving the same purpose as described in the three preferred embodiments of the present invention will still be within the intended scope of the invention.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. As used throughout, ranges are used as shorthand for describing each and every value that is within the range. Any value within the range can be selected as the terminus of the range.

What is claimed is:

1. An indirect lighting luminaire comprising:
a linear light source for indirectly lighting a space; and
a light reflector assembly including a reflector for reflecting light emitted from the linear light source towards the space to increase the efficacy of the luminaire, and a cable support device positioned behind the reflector for supporting electrical and communications cables extending longitudinally behind the reflector, supplying electrical and communications capacity to the space along a length of the light reflector assembly, wherein when the light reflector assembly is mounted on a perimeter wall surface of the space the reflector is movable independent of the cable support device to allow access to the cable support device and supported cables.

2. The luminaire of claim 1 wherein the linear light source is a linear LED light strip.

3. The luminaire of claim 1 additionally comprising a longitudinally extending support structure having a location for mounting the linear light source, wherein the light emitted from the linear light source is directed upwardly.

4. The luminaire of claim 3 wherein the linear light source support structure and light reflector assembly are configured to be mounted on the perimeter wall surface of the space with the light reflector assembly positioned above the linear light source support structure.

5. The luminaire of claim 4 wherein the light reflector assembly is mounted to the perimeter wall surface in close proximity to a ceiling.

6. The luminaire of claim 1 wherein the cable support device includes segregated power cable and communications cable routing compartments.

7. The luminaire of claim 1 wherein the cable support device is a cable tray.

8. The luminaire of claim 7 wherein the cable tray is secured to brackets supporting the reflector and used in mounting the light reflector assembly to the perimeter wall surface.

9. The luminaire of claim 7 additionally comprising one or more ventilation holes and cable access holes in a bottom section of the cable tray through which power and communications cables are directed to exit the cable tray to hardware or equipment external to the light reflector assembly.

10. The luminaire of claim 1 wherein the reflector is detachable from the light reflector assembly allowing access to the cable support device and any cables in the cable support device situated behind the reflector.

11. A longitudinally extending light assembly comprising:
an indirect lighting source mounted to a support structure configured to be secured to a wall surface, the indirect lighting source oriented on the support structure to emit light in an upward direction;
a light reflector assembly configured to be secured to the wall surface at a location above the indirect lighting source support structure, said light reflector assembly including a movable reflector oriented to redirect light emitted from the indirect lighting source away from the wall surface to increase the efficacy of the indirect lighting source, and periodically longitudinally spaced brackets supporting the reflector; and a cable support device for holding electrical and communications cables coupled to the light reflector assembly extending longitudinally behind the reflector which is selectively movable to provide access to the cable support device.

12. The light assembly of claim 11 wherein the indirect lighting source is a linear LED light source.

13. The light assembly of claim 11 wherein the brackets include a horizontal surface on which the cable support device is supported.

14. The light assembly of claim 11 wherein the reflector is detachable from the supporting brackets allowing easier access to components behind the light reflector.

15. The light assembly of claim 11 wherein the cable support device is a cable tray.

16. The light assembly of claim 15 additionally comprising a vertical divider for separating the cable tray into a power cable routing compartment and a communications cable routing compartment.

17. The light assembly of claim 15 additionally comprising one or more ventilation holes and cable access holes in the bottom section of the cable tray through which power and communications cables are directed to exit the cable tray to a hardware or equipment below.

\* \* \* \* \*